US011499949B2

(12) United States Patent
Tolley et al.

(10) Patent No.: US 11,499,949 B2
(45) Date of Patent: Nov. 15, 2022

(54) HEATERS AND THEIR USE IN TEMPERATURE GRADIENT AND TRAVELING WAVE CHROMATOGRAPHY

(71) Applicant: PERKINELMER HEALTH SCIENCES, INC., Waltham, MA (US)

(72) Inventors: Samuel Tolley, Orem, UT (US); Chad Kingston, Saratoga Springs, UT (US)

(73) Assignee: PerkinElmer Health Sciences, Inc., Waltham, MA (US)

(*) Notice: Subject to any disclaimer, the term of this patent is extended or adjusted under 35 U.S.C. 154(b) by 288 days.

(21) Appl. No.: 16/733,026

(22) Filed: Jan. 2, 2020

(65) Prior Publication Data

US 2021/0208115 A1 Jul. 8, 2021

(51) Int. Cl.
| | |
|---|---|
| *G01N 30/30* | (2006.01) |
| *G01N 30/64* | (2006.01) |
| *G01N 30/00* | (2006.01) |
| *G01N 30/02* | (2006.01) |

(52) U.S. Cl.
CPC ............. *G01N 30/64* (2013.01); *G01N 30/30* (2013.01); *G01N 2030/0095* (2013.01); *G01N 2030/025* (2013.01)

(58) Field of Classification Search
CPC ...................................................... G01N 30/30
See application file for complete search history.

(56) References Cited

U.S. PATENT DOCUMENTS

| | | | | |
|---|---|---|---|---|
| 2,756,313 | A * | 7/1956 | Cater ....................... | H05B 6/36 |
| | | | | 219/670 |
| 3,023,835 | A * | 3/1962 | Brashear ................ | G01N 30/30 |
| | | | | 73/23.26 |
| 3,146,616 | A * | 9/1964 | Loyd ..................... | G01N 30/30 |
| | | | | 73/23.26 |
| 9,927,406 | B1 * | 3/2018 | Pierce .................... | G01N 30/30 |
| 2011/0220590 | A1 * | 9/2011 | Doerr .................... | G01N 30/30 |
| | | | | 210/774 |
| 2018/0224404 | A1 * | 8/2018 | Fogwill ................. | G01N 30/34 |
| 2019/0033268 | A1 * | 1/2019 | Sabolis .................. | G01N 30/30 |

* cited by examiner

*Primary Examiner* — Lisa M Caputo
*Assistant Examiner* — Alex T Devito
(74) *Attorney, Agent, or Firm* — Rhodes IP PLC; Christopher R Rhodes

(57) ABSTRACT

Certain configurations are described of column heaters that can be used in gas chromatography applications to provide individual heating zones along a gas chromatography column. The column heater may comprise a plurality of inductive elements that can be used to provide heating zones. A thermally conductive support can be used with the gas chromatography column and the inductive elements if desired. The column heater can be used to provide a travelling wave, a thermal gradient or other heating profiles.

21 Claims, 18 Drawing Sheets

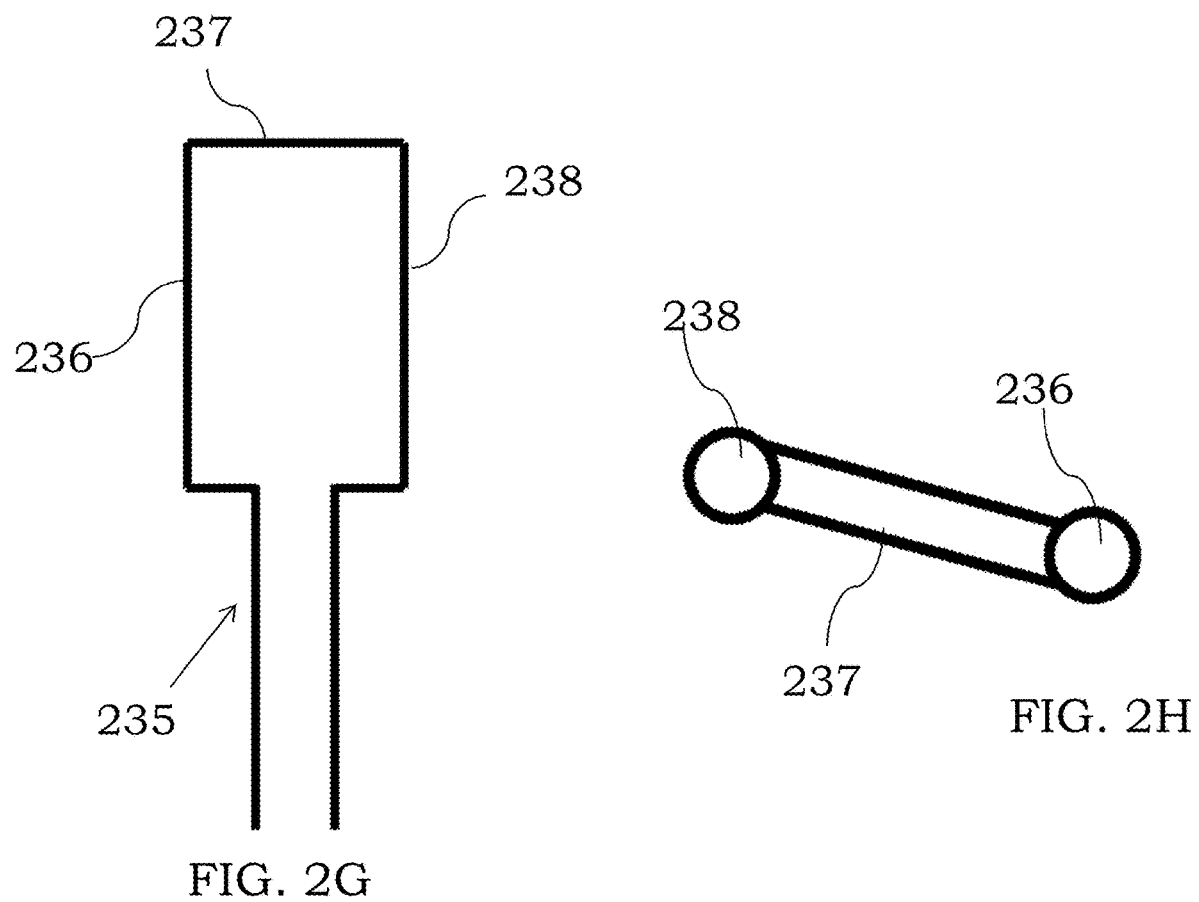
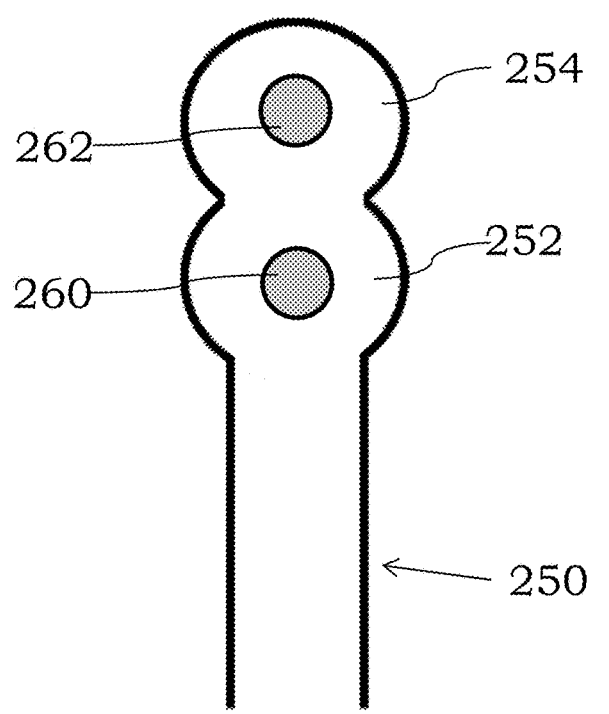

HEATERS AND THEIR USE IN TEMPERATURE GRADIENT AND TRAVELING WAVE CHROMATOGRAPHY

TECHNICAL FIELD

Certain configurations are described of heaters that can be used to provide a temperature gradient and/or traveling thermal wave during a chromatographic separation.

BACKGROUND

Gas chromatography (GC) separates analytes in the gas phase. Gas chromatography uses a mobile phase and a stationary phase to separate the gaseous analytes.

SUMMARY

Certain aspects described below are directed to heaters that can be used to heat an area or areas of a chromatography column.

In an aspect, a heater comprises a plurality of inductive heaters. In some configurations, each inductive heater comprises an inductive element. In certain embodiments, each inductive element can be arranged substantially parallel to the other inductive elements. In some examples, each of the plurality of inductive heaters provides an individually controlled heating zone along a longitudinal axis of a chromatography column, e.g., a gas chromatography column. For example, each individually controlled heating zone can correspond to a position of a respective inductive element.

In some configurations, at least one inductive element comprises a planar loop. In other configurations, each inductive element comprises a planar loop. In certain embodiments, at least one inductive element comprises a helix. In other embodiments, at least one inductive element comprises a conical shape. In some examples, the plurality of inductive heaters comprises at least three inductive heaters. In certain embodiments, the inductive elements of the inductive heaters is evenly spaced along the longitudinal axis of the gas chromatography column. In some embodiments, a longitudinal distance between each of the inductive elements is the same. In other embodiments, each of the inductive elements comprises a similar cross-sectional shape. In some configurations, a cross-sectional shape of a first inductive element is different than a cross-sectional shape of a second inductive element.

In other configurations, the heat comprises a thermally conductive support magnetically coupled to each of the plurality of inductive elements and configured to permit winding of the gas chromatography column around the thermally conductive support. In some embodiments, the thermally conductive support is configured to position the longitudinal axis of the gas chromatography column substantially perpendicular to a plane of the inductive elements. In other embodiments, at least one of the inductive heaters is configured to move along the longitudinal axis of the gas chromatography column.

In certain embodiments, the heater comprises at least one processor electrically coupled to each of the plurality of inductive heaters, wherein the at least one processor is configured to control each of the inductive heaters individually to provide a thermal gradient to the gas chromatography column.

In some embodiments, the heater comprises at least one processor electrically coupled to each of the plurality of inductive heaters, wherein the at least one processor is configured to control each of the inductive heaters individually to provide a travelling thermal wave along the gas chromatography column.

In another aspect, a method of providing a thermal gradient to a gas chromatography column comprises individually controlling a temperature at each of a plurality of heating zones along a longitudinal axis of the gas chromatography column. In some configurations, the temperature at each heating zone is controlled using a respective inductive heater comprising an inductive element. In other embodiments, the temperature at a heating zone at an inlet end of the gas chromatography column is different than a temperature at a heating zone at an exit end of the gas chromatography column to provide the thermal gradient to the gas chromatography column.

In certain configurations, the thermal gradient is provided by heating each heating zone along the longitudinal axis of the gas chromatography column, wherein a temperature along the heating zones decreases from the inlet end of the gas chromatography column to the exit end of gas chromatography column. In other configurations, the respective inductive heaters heat the gas chromatography column and provide the thermal gradient to the gas chromatography column without using an oven. In some embodiments, the gas chromatography column is wound around a thermally conductive support that is configured to position the longitudinal axis of the gas chromatography column perpendicular to a plane of each inductive element of the inductive heaters, and wherein the thermally conductive support is magnetically coupled to each of the inductive elements.

In other embodiments, the method comprises moving at least one of the inductive heaters along the longitudinal axis of the gas chromatography column during the thermal gradient.

In an additional aspect, a method of providing a traveling thermal wave along a gas chromatography column comprises individually controlling a temperature at each of a plurality of heating zones along a longitudinal axis of the gas chromatography column. In some embodiments, the temperature at each heating zone is controlled using a respective inductive heater comprising an inductive element. In other embodiments, a temperature of the heating zones is sequentially increased from an inlet end of the gas chromatography column to an exit end of the gas chromatography column to provide the traveling thermal wave to the gas chromatography column.

In certain configurations, the method comprises incrementally heating a first heating zone at the inlet end during a first period, incrementally heating a second heating zone downstream of the first heating zone during a second period, and incrementally heating a third heating zone downstream of the second heating zone during a third period. In other configurations, the respective inductive heaters provide the traveling thermal wave to the gas chromatography column without using an oven. In some embodiments, the gas chromatography column is wound around a thermally conductive support that is configured to position the longitudinal axis of the gas chromatography column perpendicular to each inductive element of the inductive heaters.

In certain embodiments, the method comprises moving at least one of the inductive heaters along the longitudinal axis of the gas chromatography column when providing the traveling thermal wave.

In another aspect, a gas chromatography system comprises a column space configured to receive a gas chromatography column, a column heater thermally coupled to the column space, and a detector configured to fluidically couple to the gas chromatography column in the column space. In certain configurations, the column heater comprises a plurality of inductive heaters each comprising an inductive element, wherein each inductive element is arranged substantially parallel to other inductive elements of the plurality of inductive heaters, wherein each of the plurality of inductive heaters provides an individually controlled heating zone along a longitudinal axis of the gas chromatography column, each individually controlled heating zone corresponding to a position of a respective inductive element.

In some embodiments, at least one inductive element comprises a planar loop. In other embodiments, each inductive element comprises a planar loop. In some examples, at least one inductive element comprises a helix. In other embodiments, at least one inductive element comprises a conical shape. In certain instances, at least three individual inductive heaters are present in the gas chromatography system. In additional examples, the inductive elements of the inductive heaters are evenly spaced along the longitudinal axis of the gas chromatography column. In some embodiments, a longitudinal distance between each of the inductive elements is the same. In other embodiments, each of the inductive elements comprises a similar cross-sectional shape. In further embodiments, a cross-sectional shape of a first inductive element is different than a cross-sectional shape of a second inductive element.

In certain embodiments, the gas chromatography system comprises a thermally conductive support magnetically coupled to each of the plurality of inductive elements and configured to permit winding of the gas chromatography column around the thermally conductive support. In some embodiments, the thermally conductive support is configured to position the longitudinal axis of the gas chromatography column perpendicular to a plane of the inductive elements. In other embodiments, at least one of the inductive heaters is configured to move along the longitudinal axis of the gas chromatography column.

In some configurations, the gas chromatography system comprises at least one processor electrically coupled to each of the plurality of inductive heaters, wherein the at least one processor is configured to control each of the inductive heaters individually to provide a thermal gradient to the gas chromatography column.

In certain configurations, the gas chromatography system comprises at least one processor electrically coupled to each of the plurality of inductive heaters, wherein the at least one processor is configured to control each of the inductive heaters individually to provide a travelling thermal wave along the gas chromatography column.

In an additional aspect, a gas chromatography system comprises a column space configured to receive a gas chromatography column, a column heater thermally coupled to the column space and comprising a plurality of independent inductive heaters each comprising an inductive element, a thermally conductive support configured to thermally couple to the gas chromatography column, wherein a respective area of the thermally conductive support is magnetically coupled to a respective inductive element to provide a plurality of individually controlled heating zones along a length of the thermally conductive support, and a detector configured to fluidically couple to the gas chromatography column in the column space.

In certain embodiments, at least two inductive elements are not parallel to each other. In other embodiments, the thermally conductive support is curved.

In another aspect, a gas chromatography system comprises a column space configured to receive a non-linear gas chromatography column, a column heater thermally coupled to the column space and comprising a plurality of independent inductive heaters each comprising an inductive element, wherein a respective inductive element is configured to provide a respective heating zone at different areas along the non-linear gas chromatography column positioned in the column space, and wherein at least two inductive elements are not parallel to each other, and a detector configured to fluidically couple to the non-linear gas chromatography column in the column space.

In certain embodiments, none of the inductive elements of the column heater are parallel to each other. In other embodiments, the non-linear gas chromatography column comprises a curved capillary column.

In another aspect, a heater comprises a plurality of individual inductive elements, each inductive element comprising a radial plane that is arranged substantially parallel to an individual radial plane of a gas chromatography column, wherein each of the plurality of inductive elements provides an individually controlled heating zone, and wherein each individually controlled heating zone corresponds to a longitudinal position of the radial plane of a respective inductive element.

In an additional aspect, a heater comprises a plurality of individual inductive elements each magnetically coupled to a thermally conductive support configured to thermally couple to a gas chromatography column, each inductive element comprising a radial plane that is arranged substantially parallel to an individual radial plane of the thermally conductive support, wherein each of the plurality of inductive element provides an individually controlled heating zone, and wherein each individually controlled heating zone corresponds to a longitudinal position of the radial plane of a respective inductive element.

Additional aspects, configurations, examples and embodiments are described in more detail below.

BRIEF DESCRIPTION OF THE SEVERAL VIEWS OF THE DRAWINGS

Certain specific configurations are described to better illustrate some of the features of the technology described herein with reference to the accompanying drawings in which:

FIGS. 2G and 2H show an inductive element with different arms in different radial planes, in accordance with some configurations;

FIG. 2I shows an illustration of an inductive element comprising first and second apertures, in accordance with certain embodiments;

It will be recognized by the person of ordinary skill in the art, given the benefit of this disclosure, that the dimensions, shapes, orientations and configurations shown in the figures are provided merely for illustration and to provide a more user-friendly description of certain features of the technology described herein. Embodiments of the technology may adopt other shapes, arrangements, configurations and the like.

DETAILED DESCRIPTION

Certain configurations are described of a heater and systems such as gas chromatography systems, mass spectrometers and other systems that include a heater. The heater may comprise one or more inductive elements to provide a heating zone to a gas chromatography column that is thermally coupled to the heater. In some instances, the gas chromatography column may comprise a metal or magnetic coating on an outer surface to magnetically couple the inductive elements to the column. In other instances, a thermally conductive support may be thermally coupled to the gas chromatography column and magnetically coupled to the inductive elements to provide heat to the gas chromatography column. In some instances, the heater may comprise a plurality of inductive elements each of which can provide a heating zone to some portion or area of the gas chromatography column. The inductive elements may have the same cross-sectional shape or different cross-sectional shapes as desired. Further, the overall dimensions of the inductive elements can be the same or can be different as desired. In some instances, the various inductive elements can be electrically coupled to a processor to provide a desired temperature profile along the gas chromatography column. For example, the inductive elements can be used to provide a temperature gradient along the gas chromatography column or to provide a travelling thermal wave along the gas chromatography column.

Figure 1:
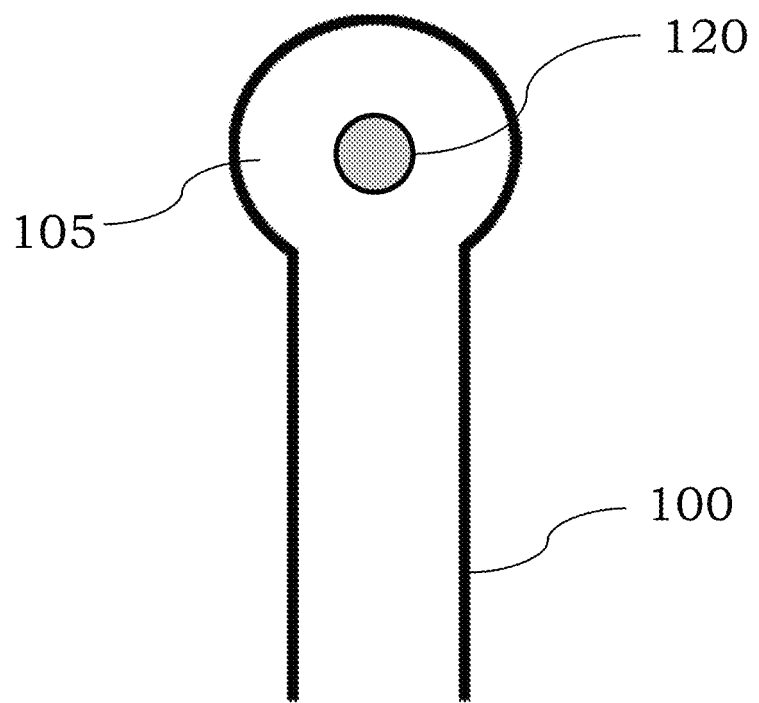
FIG. 1 is an illustration showing a cross-section of an inductive element comprising a planar loop, in accordance with certain embodiments.

An illustration of an example of an inductive element that can be used to provide heat to a region of a gas chromatography column is shown in FIG. 1. For example, a GC column that comprises a magnetic or paramagnetic material coated onto it, or present in the GC column housing, may be used in combination with one or more inductive elements to heat a region or regions of the GC column. In this illustration, the inductive element 100 is configured as a planar loop that comprises an aperture 105 where a gas chromatography (GC) column 120 is positioned. While the gas chromatography column 120 is shown as a cylinder in FIG. 1 for illustration purposes, typical gas chromatography columns can be configured as coiled capillaries or may take other forms such as, for example, a straight or curved capillary. The inductive element 100 can heat an area of the GC column 120 adjacent to the planar coil, e.g., the column 120 may comprise a magnetic coating or material whose temperature can increase in the presence of the field or energy provided by the inductive element 100. This heating zone can control the temperature of the certain area or region of the GC column 120 within the planar loop and/or nearby the planar loop. By including a plurality of inductive elements along a longitudinal axis of the GC column 120, a plurality of individually controllable heating zones can be present to control the temperature at different areas or regions of the GC column 120. In some instances, the temperature at each heating zone can be the same, whereas in other instances, the temperature at different heating zones can be different. The plurality of inductive elements may be spaced evenly or unevenly along the longitudinal axis of GC column 120 as noted in more detail below.

Figure 2A:
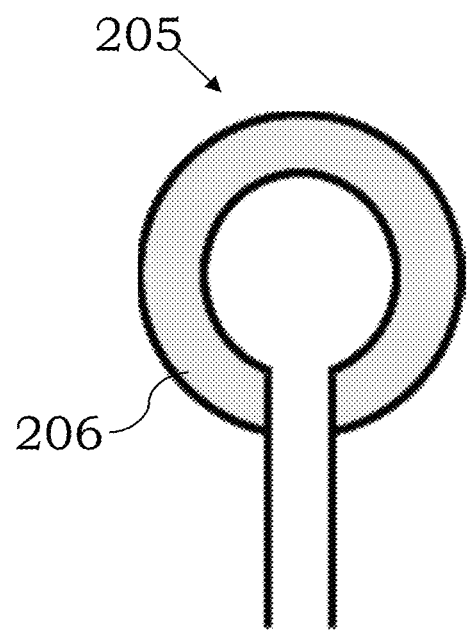
FIG. 2A is an illustration of a planar loop comprising a ring shape, in accordance with certain embodiments.
Figure 2B:
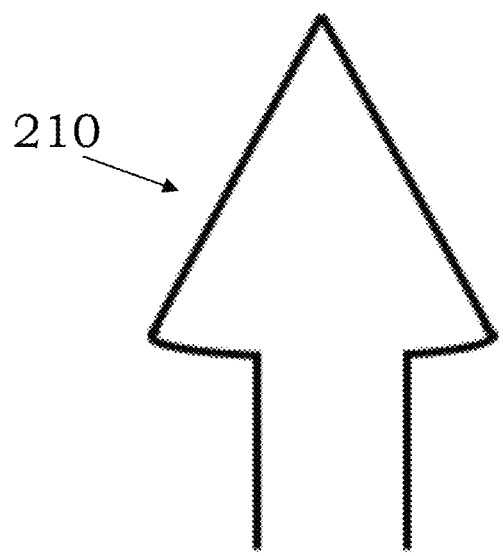
FIGS. 2B, 2C, 2D, 2E, 2F are illustrations of inductive elements with cross-sectional shapes other than planar loops including a helical shape (FIG. 2A), a triangular shape (FIG. 2B), a truncated cone shape (FIG. 2C), a rectangular shape (FIG. 2D), a triangular shape (FIG. 2E), and a hexagonal shape (FIG. 2F), in accordance with some examples.
Figure 2C:
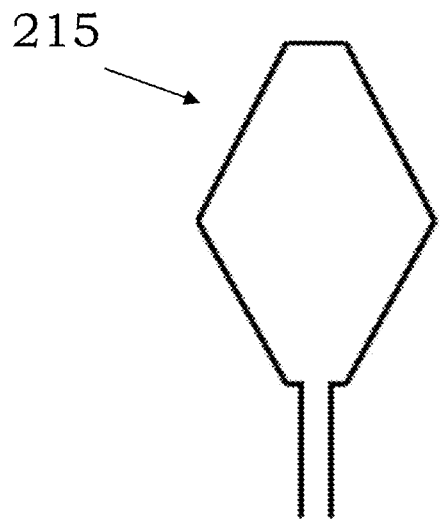
Figure 2D:
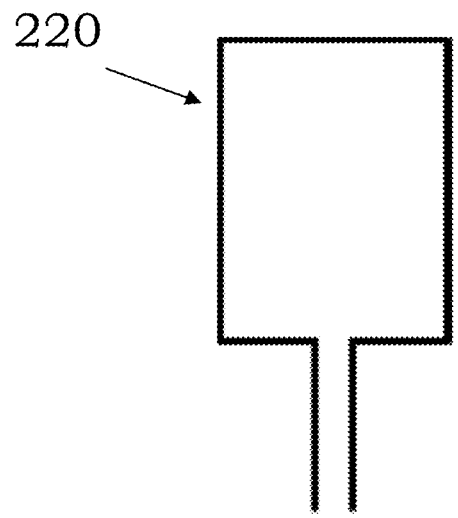
Figure 2E:
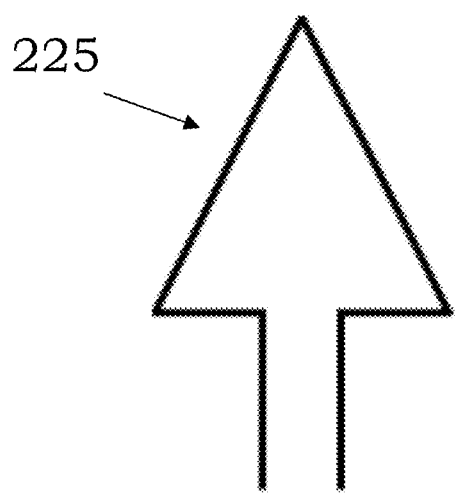

In some embodiments, the inductive elements need not comprise wires or thin metal components but may comprise a suitably sized body with an aperture that can receive some portion of a GC column. For example and referring to FIG. 2A, a planar loop 205 comprising a ring shaped planar body 206 is shown. The exact width and thickness of the body 206 may vary as desired, and in some instances, the body 206 can be produced from stamped sheet metal or by cutting out a suitable shape from sheet metal, e.g., sheet metal comprising a conductive metal material. While certain representations of inductive elements are shown below as wires for ease of illustration, the inductive elements may comprise a desired width, thickness, height and overall shape to provide a selected heating profile.

Figure 2F:
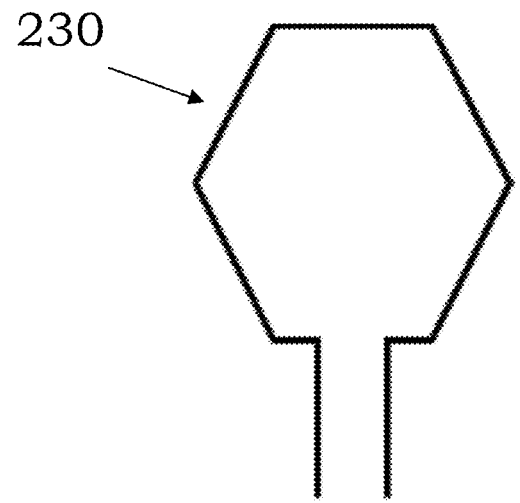

In some embodiments, the inductive elements used in the heaters described herein need not be planar or even have a loop cross-sectional shape. Referring to FIGS. 2B-2F various illustrations (top views) of other shapes that an inductive element may adopt include but are not limited to, a conical shape inductive element 210 (FIG. 2B), a truncated cone shaped inductive element 215 (FIG. 2C), a rectangular shaped inductive element 220 (FIG. 2D), a triangular shaped inductive element 225 (FIG. 2E), a hexagonal shaped inductive element 230 (FIG. 2F). While FIGS. 2B-2F illustrate possible shapes an inductive element may adopt, embodiments are not limited to these shapes. Moreover, in examples where multiple inductive elements are present, the inductive elements need not be the same shape.

In certain embodiments, the inductive element need not be planar or flat but can include legs or arms in different horizontal planes as shown in FIG. 2G and FIG. 2H, where one arm 238 of the inductive element 235 is positioned above another arm 236 of the inductive element 235. The arms 236, 238 can be connected through member 237 as shown in the end view in FIG. 2H. If desired, the inductive element 235 can be tilted relative to an axis of GC column or thermally conductive support to position both arms 236, 238 (or the member 237) in substantially the same radial plane as a radial plane of the GC column or thermally conductive support.

In some embodiments, more than one GC column can be positioned within an inductive element. One possible configuration is shown in FIG. 2I where an inductive element 250 is shown as comprising a first aperture 252 and a second aperture 254. A first GC column 260 is positioned in the first aperture 252, and a second GC column 262 is positioned in the second aperture 254. While the apertures 252, 254 are shown as being about the same size, this sizing is not required and the apertures 252, 254 may have different sizes, shapes, dimensions, etc. as desired. Additionally, the first GC column 260 and the second GC column 262 may have different sizes and/or be the same type of GC column or a different type of GC column. The thickness and materials of the inductive element 250 members adjacent to each of the GC columns 260, 262 may also be the same or different.

The inductive elements may be formed from a conductive material or conductive materials. Illustrative materials which can be used to provide the inductive elements include, but are not limited to, copper, bronze, brass, tin, aluminum, tungsten, silver, iron, steel, and other metal alloys. The inductive elements can each be configured as a coil that an electric current is passed through to provide a magnetic field. The coil may adopt many different overall shapes as noted in connection with FIGS. 2A-2I. The exact voltage provided to the inductive elements may vary from about 1 Volt to about 100 Volts. The voltage may be provided from an alternating current power source, a direct current power source, a radio frequency source or other sources including line voltage sources, portable voltage sources, e.g., batteries, etc. While not being bound to a particular theory of operation, a magnetic field from the inductive element can produce an eddy current in or more areas of the GC column, which can include a magnetic or paramagnetic material (e.g., a magnetic coating or material on the outside of the GC column or in the housing of the GC column). In some configurations, the material coated onto the GC column, or used to produce a housing of the GC column, may comprise one or more of steel, stainless steel, and other ferrous materials, as well as nickel, copper, cobalt, tungsten, aluminum, and other materials that are magnetic or paramagnetic and are thermally conductive that can heat up in the presence of the inductive element. The resistance of the material to current flow can result in heating of the material and heating of that area of the GC column. While not required, inductive elements that include a C2 symmetry axis can be used so any magnetic field lines that are produced are substantially symmetric about the C2 axis so similar heating may occur. For example, a C2 axis of symmetry permits the inductive element to be rotated by about 180 degrees and still provide a similar magnetic field due to the symmetrical shape of the inductive element.

Figure 2J:
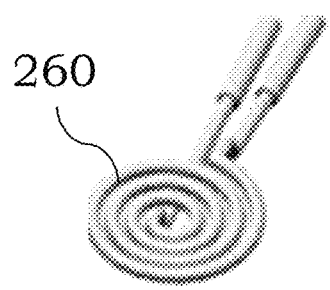
FIGS. 2J, 2K, 2L, 2M, 2N, 2O, 2P, 2Q, 2R, 2S, 2T, 2U, 2V and 2W show other shapes of inductive elements including planar loop shapes (FIGS. 2J and 2M), a helical shape FIG. 2K), a conical spiral (FIG. 2L), a non-planar and non-helical shape (FIG. 2N), stacked coil shapes (FIG. 2O), multi-turn shapes (FIGS. 2P, 2Q and 2R), an open end C-coil shape (FIG. 2S), a pancake shape (FIG. 2T), a single turn coil (FIG. 2U), a non-planar and non-helical shape (FIG. 2V) and a hairpin coil shape (FIG. 2W), in accordance with some embodiments.
Figure 2K:
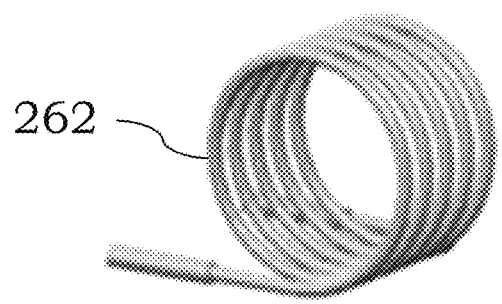
Figure 2L:
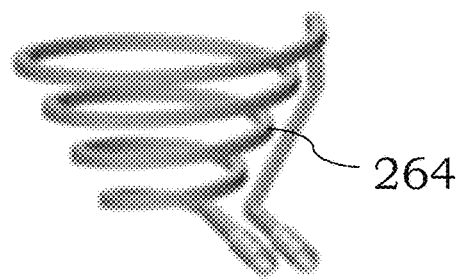
Figure 2M:
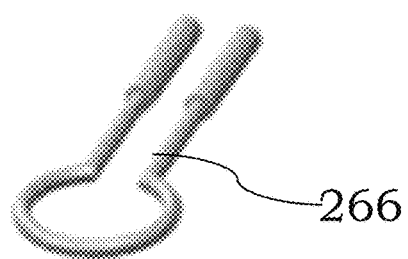
Figure 2N:
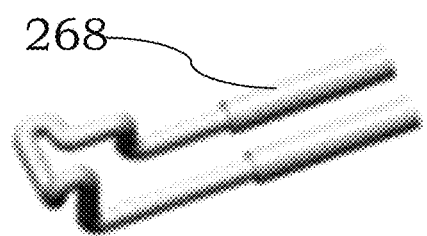
Figure 2O:
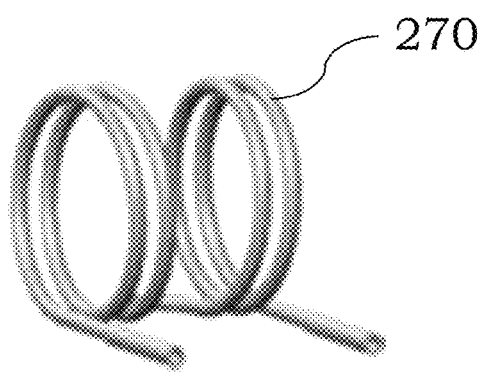
Figure 2P:
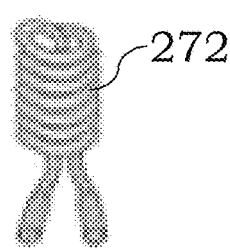
Figure 2Q:
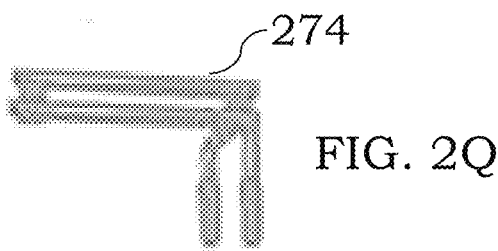
Figure 2R:
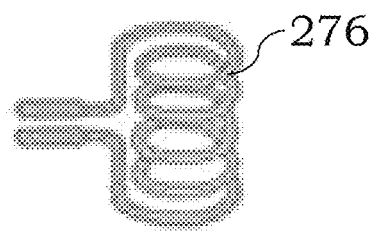
Figure 2S:
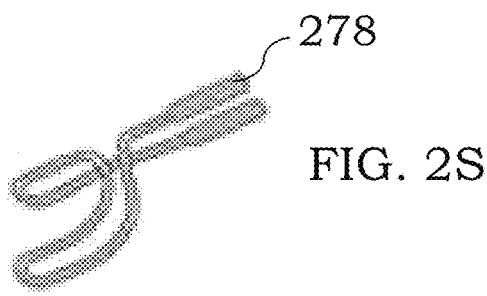
Figure 2T:
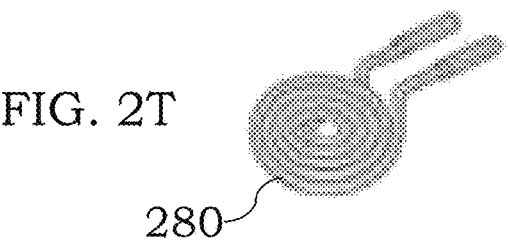
Figure 2U:
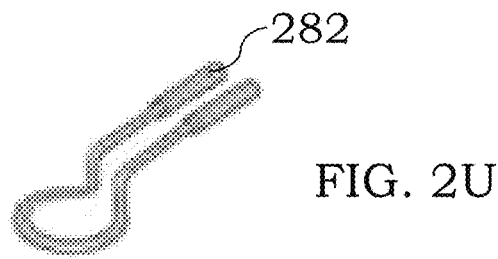
Figure 2W:
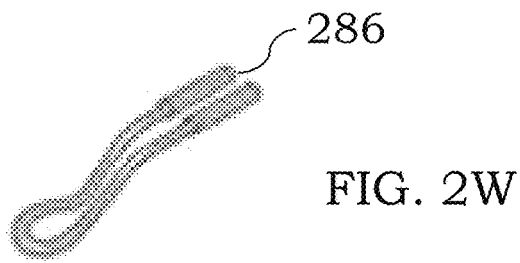
Figure 2V:
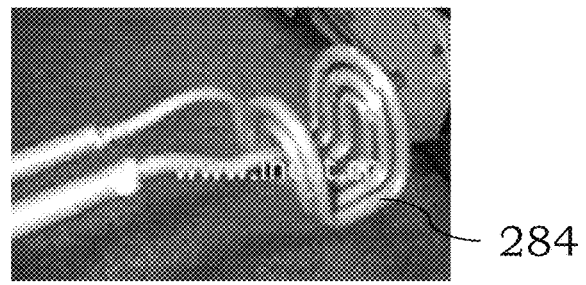

In certain embodiments, the inductive elements may take other shapes including, for example, planar loop shaped inductive elements 260 and 266 (see FIGS. 2J and 2M, respectively), a helical shaped coil inductive element 262 (FIG. 2K), a conical spiral shaped inductive element 264 (FIG. 2L), a non-planar and non-helical shaped inductive element 266 (FIG. 2N), a stacked coil shaped inductive element 268 (FIG. 2O), a multi-turn shaped inductive element 272 or 274 or 276 (see FIGS. 2P, 2Q and 2R, respectively), an open end C-coil shaped inductive element 278 (FIG. 2S), a pancake shaped inductive element 280 (FIG. 2T), a single turn coil inductive element 282 (FIG. 2U), a non-planar and non-helical shaped inductive element 284 (FIG. 2V) and a hairpin coil shaped inductive element 286 (FIG. 2W), Additional suitable shapes are also possible and may be used. Further, all inductive elements need not comprise the same shape when present in an inductive heater comprising a plurality of inductive elements.

Figure 3A:
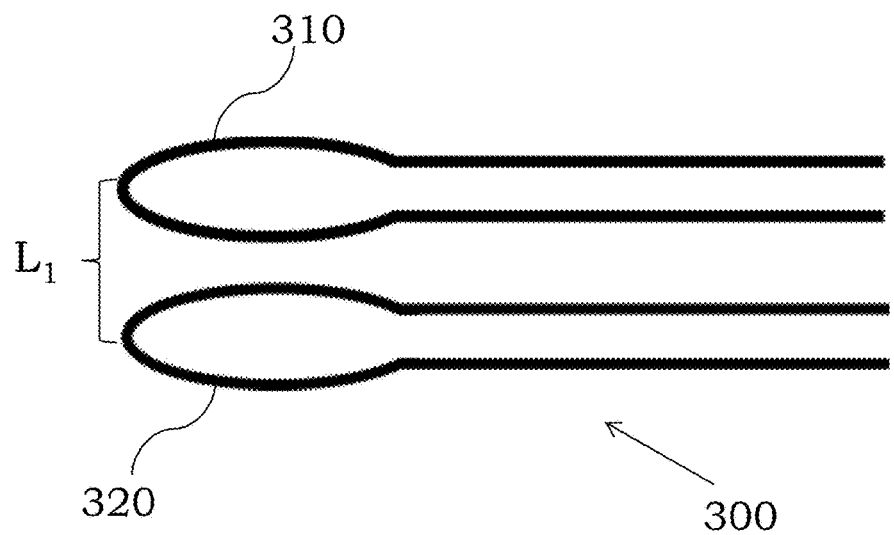
FIG. 3A is an illustration showing a heater comprising two inductive elements, in accordance with certain embodiments.

In certain embodiments, the heaters described herein may comprise at least two inductive elements. One illustration is shown in FIG. 3A where the heater 300 comprises a first inductive element 310 and a second inductive element 320. A horizontal plane of each of the first inductive element 310 and the second inductive element 320 can be substantially parallel to each other or may be non-parallel if desired. The exact longitudinal distance Li between each of the inductive elements 310, 320 may vary and may change from GC separation to GC separation or when using different temperature profiles or thermal wave profiles. A GC column and/or a thermally conductive support (not shown) can be positioned in the apertures of the inductive elements 310, 320. While generally circular planar loops are shown in FIG. 3A for ease of illustration, this shape and configuration is not required. For example, the shapes illustrated in FIGS. 2A-2F, or other shapes not illustrated, may be used. In some instances, at least one of the inductive elements 310, 320 comprises a planar loop. In other examples, each of the inductive elements 310, 320 comprises a planar loop. In certain embodiments, at least one of the inductive elements 310, 320 comprises a helix. In other examples each of the inductive elements 310, 320 comprises a helix. In some examples, at least one of the inductive elements 310, 320 comprises a conical shape. In other examples each of the inductive elements 310, 320 comprises a conical shape. In other embodiments, each of the inductive elements 310, 320 comprises a similar cross-sectional shape, though if desired, the inductive elements 310, 320 may comprise a different cross-sectional shape. As noted herein and as shown in FIG. 3B, one or both of the inductive elements 310, 320 can be configured to move in a direction that is generally parallel to longitudinal axis $LA_1$ of a GC column 350 if desired, e.g., can be moved longitudinally using a motor or other device.

In certain configurations, the longitudinal axis $LA_1$ of the GC column 350 can generally be parallel to a coiled GC column formed by winding or coiling the GC column, and the longitudinal axis $LA_1$ may be substantially orthogonal to each of the coil windings. For example, the GC column 350 in FIG. 3B can take the form of a coiled GC column 370 as shown in FIG. 3C. The coiled GC column 370 comprises an inlet end 380 and an outlet end 382 with a plurality of coil turns between the inlet end 380 and the outlet end 382. The coil turns typically comprise an internal chromatography medium that can be used in combination with a mobile phase to separate analytes. For example, sample can enter the column 370 through the inlet end 380, be separated using an introduced mobile phase and a chromatography medium present within the coils or windings of the GC column 370, and then individual analytes can elute from the exit end 382 of the GC column 370. A longitudinal axis $LA_2$ is shown relative to a radial plane $RP_1$. A plane of each of the coils or windings of the GC column 370 may be substantially parallel to the radial plane $RP_1$, though some slight tilting is typically present due to the coiling. While not shown in FIG. 3C, a thermally conductive support can be positioned within an inner aperture or space formed by the coiled GC column 370, or, in the alternative, the coils of the GC column 370 may be formed by winding the GC column 370 around an outside of a suitably shaped thermally conductive support so the inlet end 380 is positioned toward one end of the thermally conductive support and the exit end 384 is positioned toward a second end of the thermally conductive support. For example, a longitudinal axis (not shown) of the thermally conductive support may be substantially parallel to the longitudinal axis $LA_2$ of the GC column 370 when the GC column 370 is wound around the thermally conductive support.

Figure 3B:
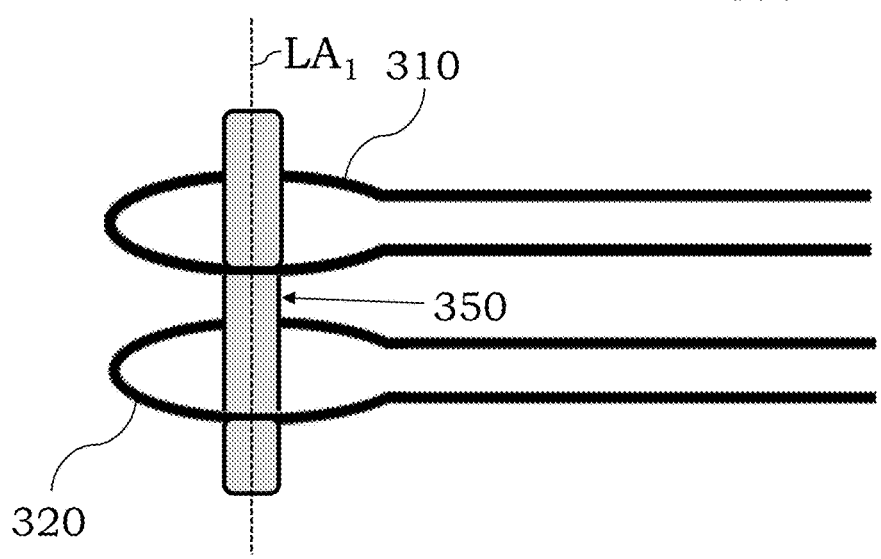
FIG. 3B is an illustration showing a heater comprising two inductive elements and a GC column placed within the inductive elements of the heater, in accordance with certain embodiments.
Figure 3C:
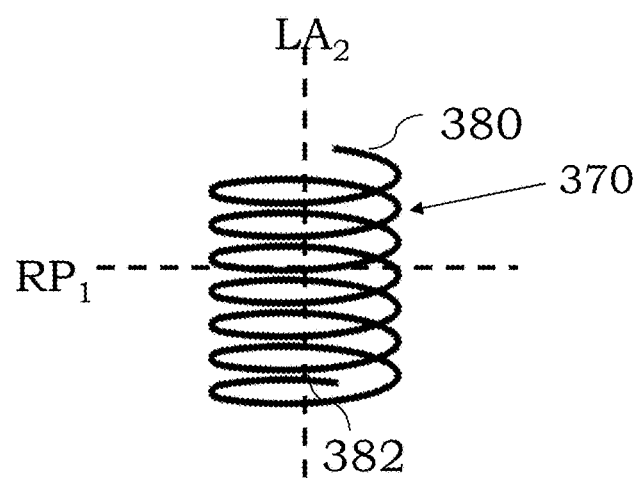
FIG. 3C is an illustration of a coiled GC column, in accordance with certain embodiments.

While not shown in FIGS. 3A and 3B, the inductive elements 310, 320 in FIGS. 3A and 3B can be electrically coupled to a processor. For example, the processor can be configured to individually control each of the inductive elements 310, 320 to provide a thermal gradient to a gas chromatography column positioned within the apertures of the inductive elements 310, 320. In a different configuration, the processor can be configured to individually control each of the inductive elements 310, 320 individually to provide a travelling thermal wave along the gas chromatography column as discussed in more detail below.

Figure 4:
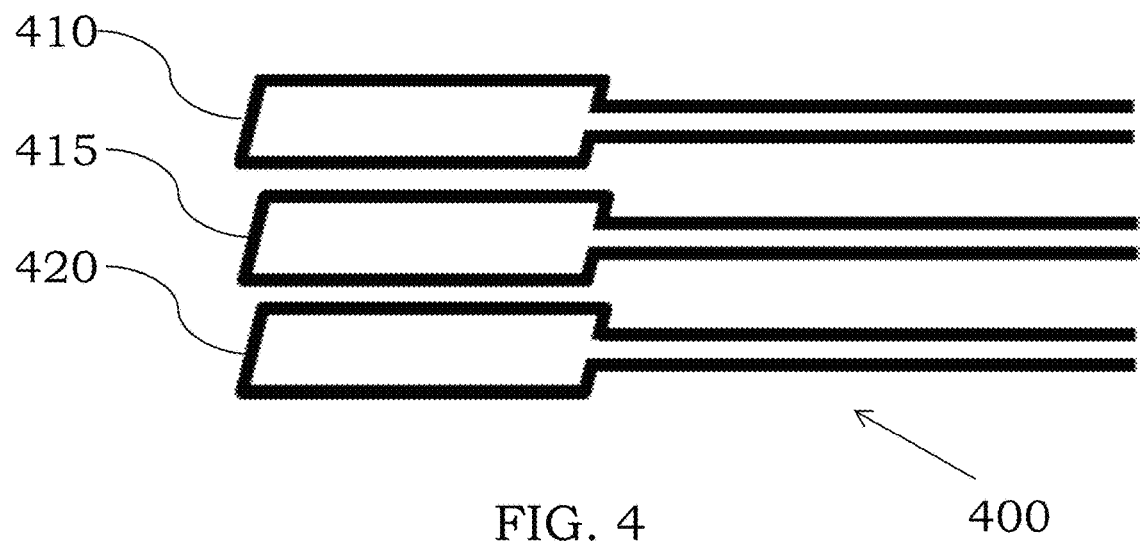
FIG. 4 is an illustration showing a heater comprising three inductive elements, in accordance with certain embodiments.

In certain embodiments, the heaters described herein may comprise at least three inductive elements. One illustration is shown in FIG. 4 where the heater 400 comprises a first inductive element 410, a second inductive element 415 and a third inductive element 420. Horizontal planes in which each of the first inductive element 410, the second inductive element 415 and the third inductive element 420 respectively lie can be substantially parallel to each other or may be non-parallel if desired. A GC column and/or thermally conductive support (not shown) can be positioned in the apertures of the inductive elements 410, 415, and 420. While rectangular planar loops are shown in FIG. 4 for ease of illustration, this shape and configuration is not required. For example, the shapes illustrated in FIGS. 2A-2F, or other shapes not illustrated, may be used. In some instances, at least one of the inductive elements 410, 415, 420 comprises a planar loop. In certain instances, at least two of the inductive elements 410, 415, 420 comprises a planar loop. In other examples, each of the inductive elements 410, 415, 420 comprises a planar loop. In certain embodiments, at least one of the inductive elements 410, 415, 420 comprises a helix. In other embodiments, at least two of the inductive elements 410, 415, 420 comprises a helix. In other examples, each of the inductive elements 410, 415, 420 comprises a helix. In some examples, at least one of the inductive elements 410, 415, 420 comprises a conical shape. In certain examples, at least two of the inductive elements 410, 415, 420 comprises a conical shape. In other examples, each of the inductive elements 410, 415, 420 comprises a conical shape. In other embodiments, each of the elements 410, 415, 420 comprises a similar cross-sectional shape, though if desired, the inductive elements 410, 415, 420 may comprise a different cross-sectional shape. As noted herein, one two or all three of the inductive elements 410, 415, 420 can be configured to move along a longitudinal axis of a GC column or thermally conductive support (not shown) if desired. While not shown, the inductive elements 410, 415, 420 in FIG. 4 can be electrically coupled to a processor. For example, the processor can be configured to individually control each of the inductive elements 410, 415, 420 to provide a thermal gradient to the GC column. In a different configuration, the processor can be configured to individually control each of the inductive elements 410, 415, 420 to provide a travelling thermal wave along the GC column.

Figure 5:
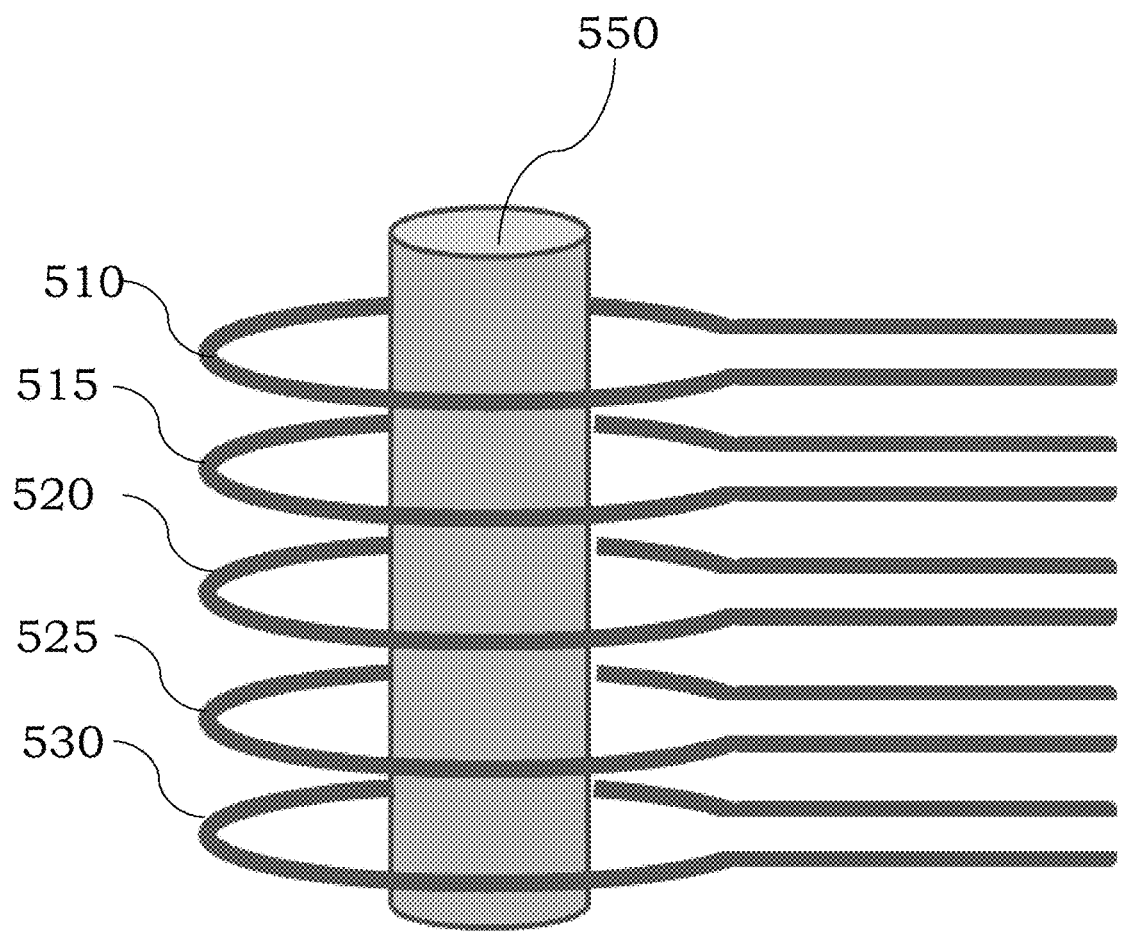
FIG. 5 is an illustration showing a heater comprising more than three inductive elements, in accordance with certain embodiments.

In other examples, more than three inductive elements can be present in a heater. FIG. 5 is an illustration showing a heater comprising more than three inductive elements. While the exact number of inductive elements may be greater than four or greater than five, five inductive elements 510, 515, 520, 525 and 530 are shown in FIG. 5 for ease of illustration. A GC column 550, which is illustrated as a cylinder, is positioned within the apertures of each of the inductive elements 510, 515, 520, 525 and 530. An individual heating zone can be provided adjacent to each of the inductive element loops using each of the inductive elements 510, 515, 520, 525 and 530. Each heating zone may be controlled to be the same temperature or different temperatures. For example, a thermal gradient or travelling wave can be produced by individually controlling a temperature at each heating zone using the inductive elements 510, 515, 520, 525 and 530. While not shown, a fan, cooling device or other device can be thermally coupled to the GC column 550 to assist in reducing or controlling a temperature of the GC column 550 before, during or after a chromatographic separation using the GC column 550. Each of the inductive elements 510, 515, 520, 525 and 530 need not be configured with the same shape. Further, the longitudinal spacing between any two or more of the inductive elements 510, 515, 520, 525 and 530 can be different or the same. In some examples, one or more of the inductive elements 510, 515, 520, 525 and 530 can move along the GC column 550. Further, any one or more of the inductive elements 510, 515, 520, 525 and 530 can move horizontally to alter a position of the GC column relative to a center of the aperture of that particular inductive element. If desired, any one or more of the inductive elements 510, 515, 520, 525 and 530 could be tilted or otherwise be non-parallel to a particular radial plane of the GC column 550.

Figure 6:
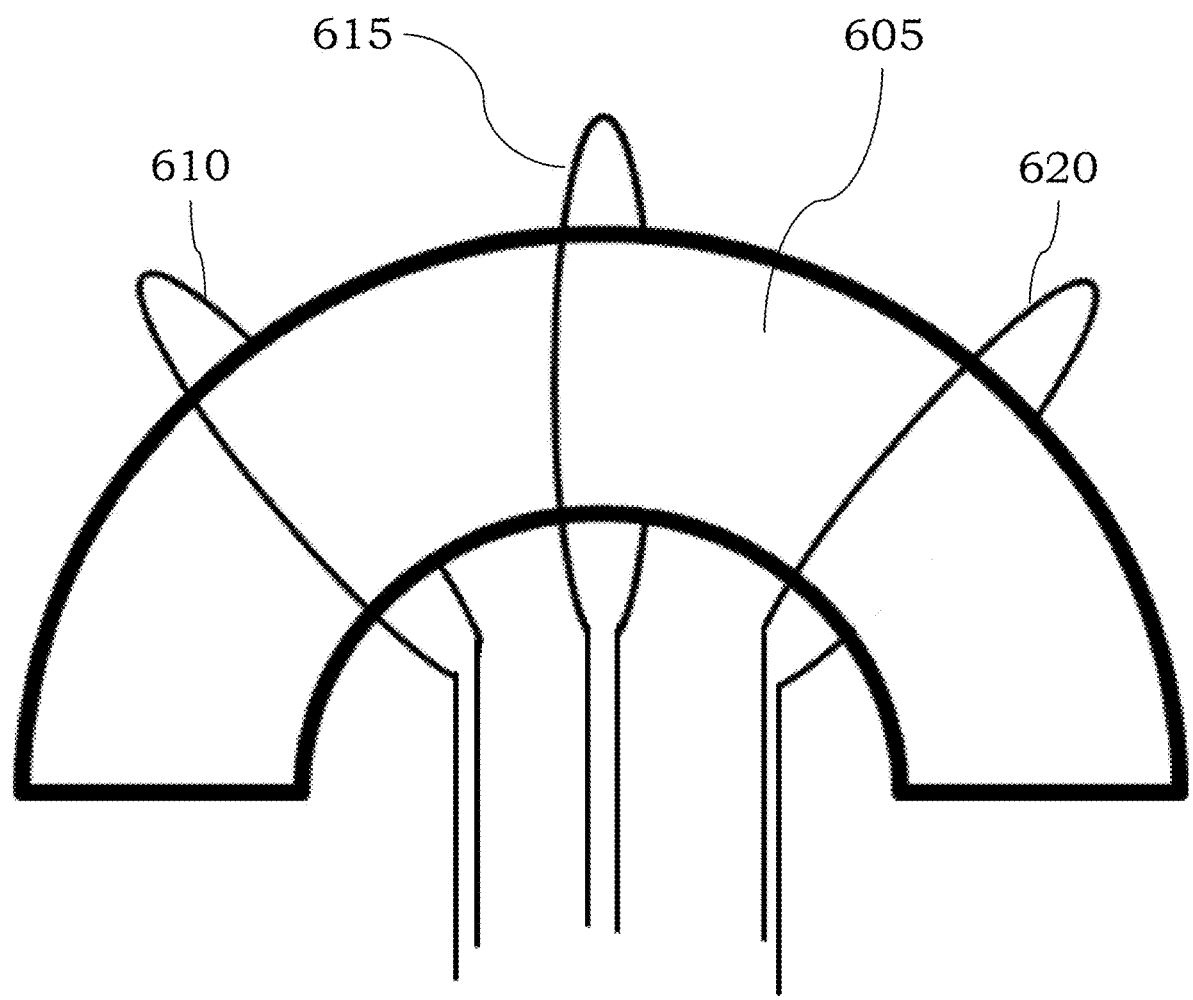
FIG. 6 is an illustration showing three inductive elements used with a non-linear column, in accordance with some examples.

In certain configurations, the inductive elements of the heater need not be arranged in a parallel manner. For example, and referring to FIG. 6, a GC column 605, which has an arc or curved shape, is shown as being positioned within an aperture of multiple inductive heating elements. For example, the GC column 605 may take the form of a curved capillary tube. As shown in this particular example, three inductive elements 610, 615 and 620 are shown as positioned along the column 605 at different areas. Fewer or more than three inductive elements can be used if desired. The column 605 may be positioned at a central area or center within an aperture of each inductive element 610, 615, 620 or at other areas. The inductive element 610 is tilted with respect to a central radial plane of the inductive element 615. Similarly, the inductive element 620 is tilted with respect to a central radial plane of the element 615. The exact angle of tilt may vary and can even be adjustable. In some examples, a tilt angle of the inductive element can be selected so a central radial plane of a particular inductive element is substantially parallel to a radial plane of the individual heating zone at that area of the GC column 605. As described herein, the different inductive elements 610, 615 and 620 can be used to provide a thermal gradient, a travelling wave or other heating methods along the GC column 605 during a chromatographic separation, e.g., a processor can be electrically coupled to each of the elements 610, 615 and 620 to control the temperature at each individual heating zone provided by each of the elements 610, 615, 620.

Figure 7:
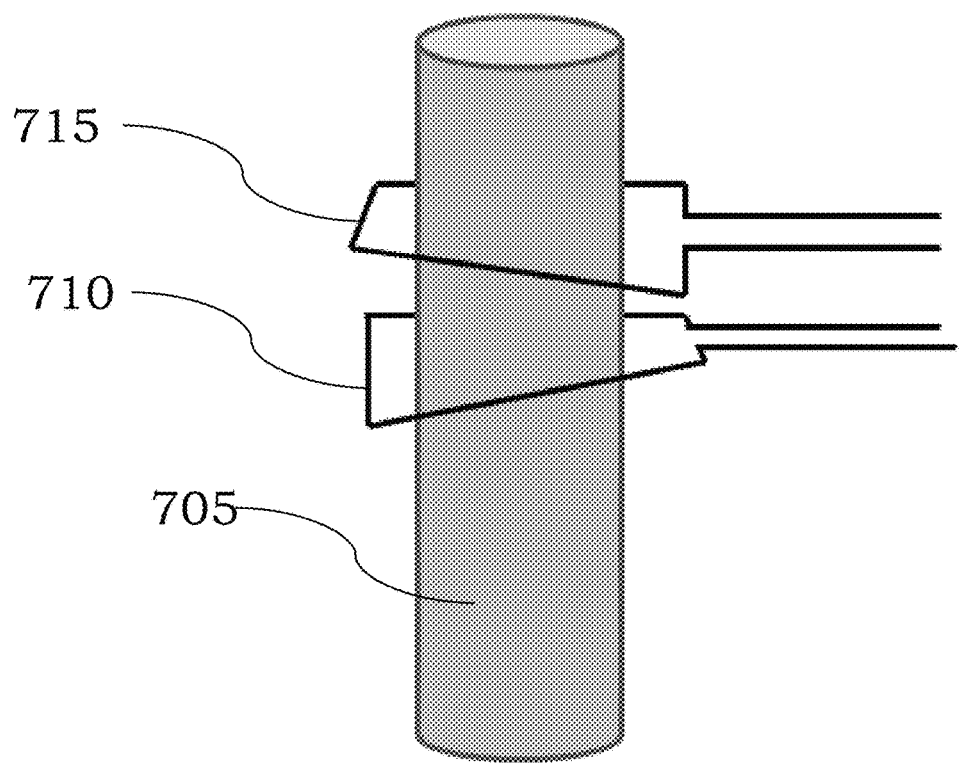
FIG. 7 is an illustration showing two non-planar inductive elements used with a column, in accordance with certain embodiments.

In some instances where an inductive element is tilted, two different inductive elements may work cooperatively to provide a single heating zone within a GC column. Referring to FIG. 7, a simple illustration is shown where a portion of a first inductive element 710 is tilted downward and a portion of second inductive element 715 is tilted upward with respect to a longitudinal axis of a column 705. The inductive or magnetic coupling provided by the inductive elements 710, 715 can constructively interfere to provide a single heating zone between and/or overlapping the inductive elements 710, 715. Alternatively, the inductive energy from the inductive elements 710, 715 could be used to cancel each other, e.g., destructively interfere, to provide a non-heated zone along a length of the column 705 or to otherwise permit fine tuning of heated areas of the column 705. Adjustment of the positioning and angles of the inductive elements 710, 715 can permit shaping of the overall temperature profile in any one heating zone along the GC column 705.

Figure 8:
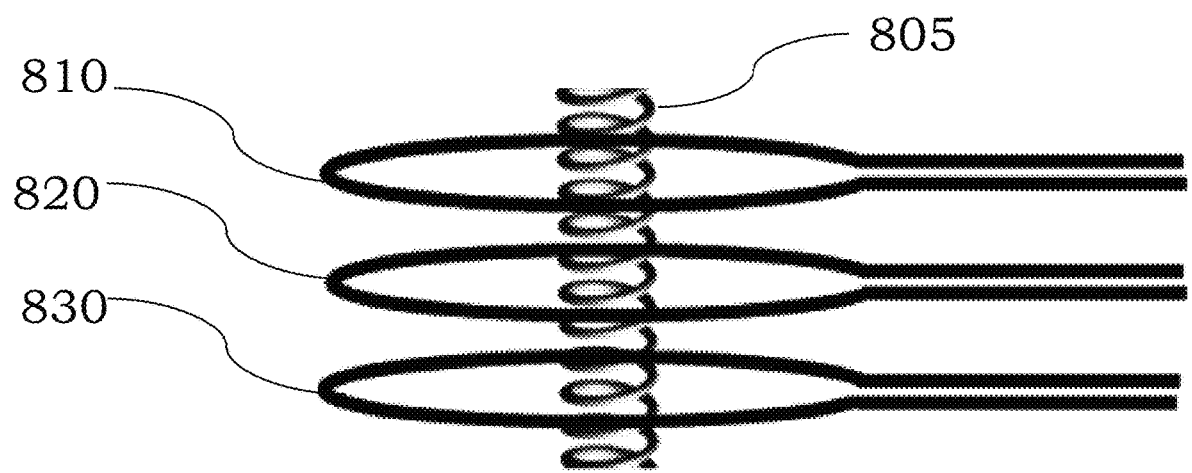
FIG. 8 is an illustration showing three inductive elements used with a coiled column, in accordance with some examples.

In other configurations, a plurality of elements can be used with a coiled GC column to provide heated zones at different areas of the GC column. In many instances for gas chromatographic separations, a column may be coiled to provide an increased path length and more theoretical plates to enhance the separation of analytes. The coil may be an extended coil, helix, or spiral as shown in the GC column 805 in FIG. 8 to permit placement of the individual inductive elements along a length of the GC column 805. For illustration purposes, inductive elements 810, 815, and 820 are shown and can be used to provide a substantially similar or constant temperature along the length of the GC column 805, can provide a thermal gradient along the length of the GC column 805, can provide a traveling wave along the length of the GC column 805 or may be used for other temperature methods to control the temperature along the GC column 805. The elements 810, 815 and 820 need not have the same shape or configuration and may be the same or different. Further, a processor (not shown) can be used to control individually each of the elements 810, 815 and 820 to provide individual heating zones along the GC column 805.

In some examples, the inductive elements described herein can be used along with a thermally conductive support that can be thermally coupled to the column and magnetically coupled to the inductive elements. Without being bound to any particular theory or any one configuration, inductive energy from the inductive elements can cause an increase in the temperature of the thermally conductive support. The heat from the support may be transferred to the thermally coupled column to control the temperature of the column. In such configurations, the GC column itself need not comprise a metallic or magnetic material or include a metallic or magnetic coating. In some examples, the thermally conductive support is a generally continuous solid support, whereas in other examples, insulators or insulative areas may be present to separate different heated areas of the thermally conductive support. If desired, cooling holes, apertures, fins or other features may also be present on or in the thermally conductive support to assist in cooling the thermally conductive support back to an initial temperature after a thermal gradient or travelling wave is provided. While various materials can be used in the thermally conductive support, illustrative materials include but are not limited to, iron, steel, stainless steel, and other ferrous materials, as well as nickel, copper, cobalt, tungsten, aluminum, and other materials that are magnetic or paramagnetic and are thermally conductive. Without wishing to be bound by any one configuration or any particular theory, a magnetic field from the inductive element can produce an eddy current at areas of the thermally conductive support. The resistance of the thermally conductive support area to current flow can result in heating of that area of the thermally conductive support. While not required, inductive elements that include a C2 symmetry axis can be used so any magnetic field lines that are produced are substantially symmetric about the C2 axis so similar heating across the radial plane of the thermally conductive support can occur. For example, an inductive element with bilateral symmetry can be used to provide a generally symmetric field that can provide similar heating across the radial plane of the thermally conductive support.

Figure 9:
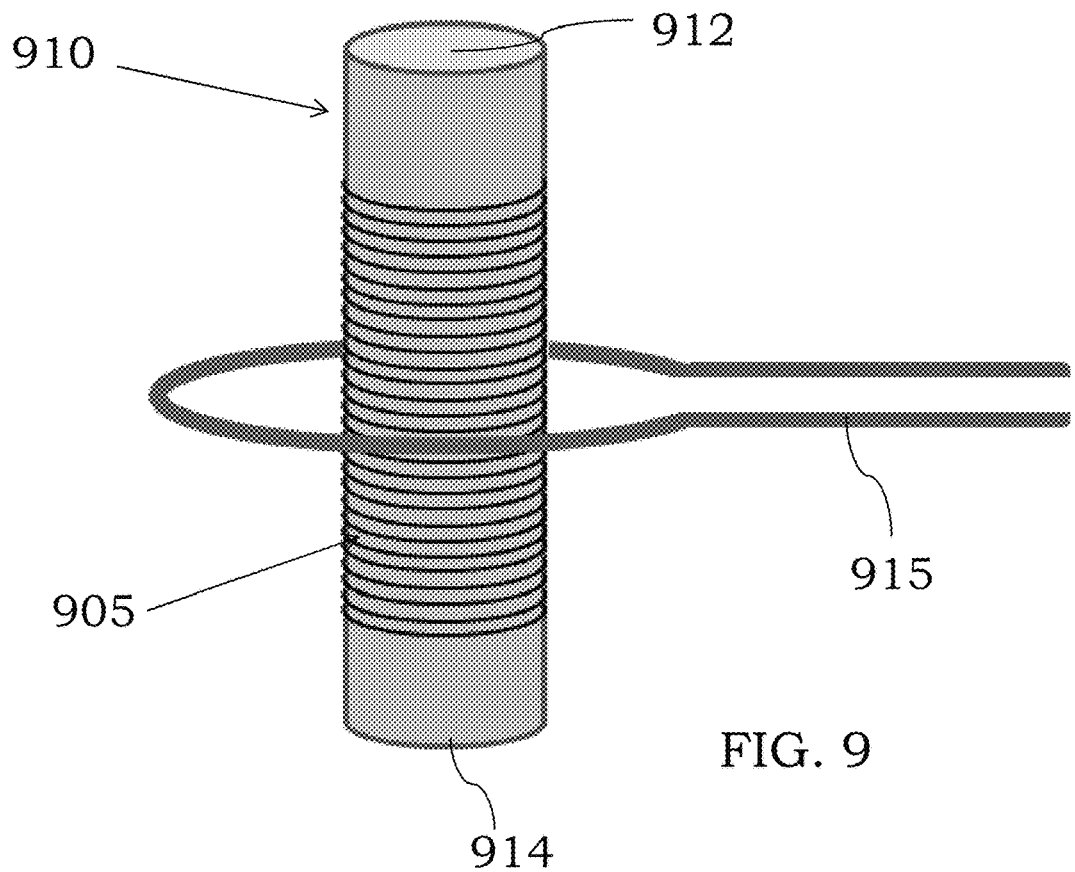
FIG. 9 is an illustration showing a heater comprising an inductive element used with a thermally conductive support thermally coupled to a column, in accordance with some examples.

Referring to FIG. 9, a thermally conductive support 910 is shown that is thermally coupled to a GC column 905. As noted herein, the GC column 905 may be wound around an outside surface of the thermally conductive support 910 to form a coiled GC column with an inlet end of the GC column 905 positioned closer to an end 912 of the thermally conductive support 910 and an exit end of the GC column 905 positioned closer to an end 914 of the thermally conductive support 910. An inductive element 915 is shown as being present and surrounds the support 910 and the GC column 905. Inductive energy can be provided from the element 915 to the thermally conductive support 910 to alter the temperature of the support 910. The heat from the support 910 can be transferred from the support 910 to the GC column 905 to control the temperature of the GC column 905. While the GC column 905 is shown as physically contacting the support 910, physical contact is not required. There may be a space between the GC column 905 and the support 910 or other intervening materials can be present between the GC column 905 and the support 910. In some instances, a cross-sectional shape of the support 910 may be different at different areas along the length of the support 910, or the diameter or other dimension of the support 910 may be different along the length of the support 910. While not shown, a position of either the support 910 or the element 915 can be altered if desired. Further, while the element 915 is shown as a round loop, other geometries such as, for example, those geometries shown in FIGS. 2A-2I or other suitable shapes could instead be used.

Figure 10:
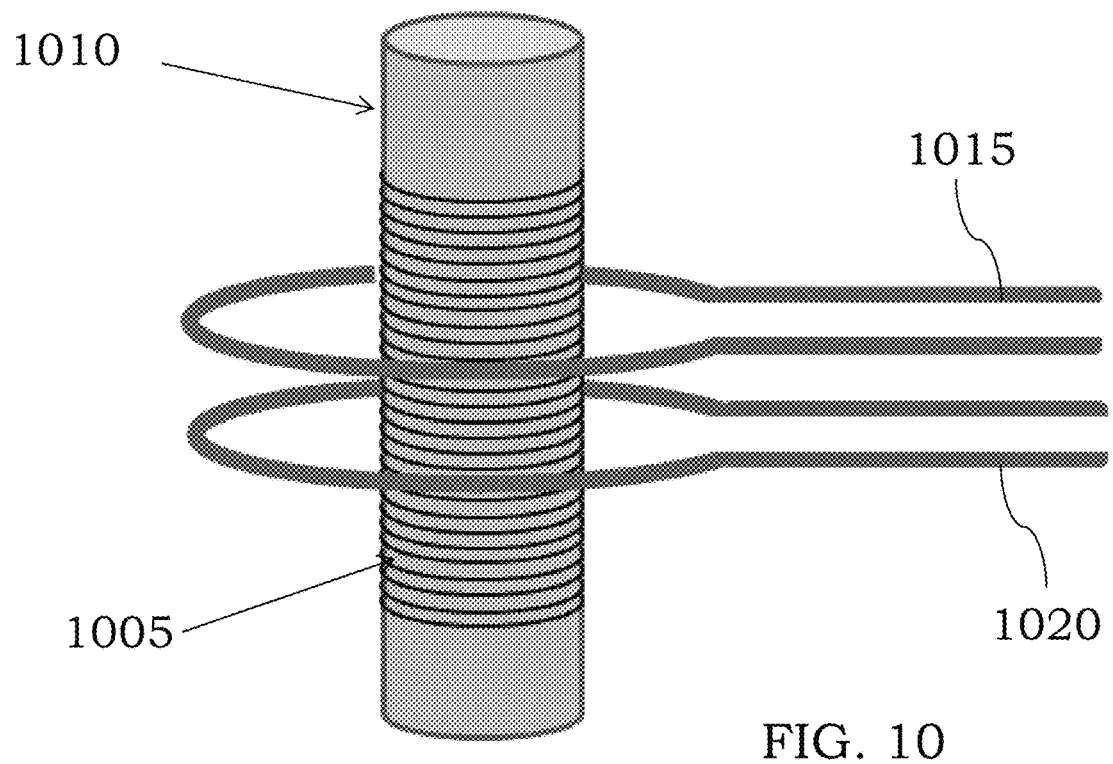
FIG. 10 is an illustration showing a heater comprising two inductive elements used with a thermally conductive support thermally coupled to a column, in accordance with some examples.

In some examples, more than a single inductive heater can be used with a thermally conductive support. Referring to FIG. 10, two inductive elements 1015, 1020 and a thermally conductive support 1010 that is thermally coupled to a GC column 1005 are shown. The inductive elements 1015, 1020 are spaced longitudinally along a length of the support 1010 such that different temperatures or heating zones can be provided using the two different inductive elements 1015, 1020. Inductive energy from each inductive element 1015, 1020 can be provided to different areas of the thermally conductive support 1010 to alter the temperature of the support 1010 at that area or region. The heat from the support 1010 can be transferred from the support 1010 to the GC column 1005 to control the temperature of the GC column 1005. For example, an area of the GC column 1005 adjacent to the inductive element 1020 could be at a higher temperature (or lower temperature) than a temperature at an area of the GC column 1005 adjacent to the inductive element 1015. In some instances, a cross-sectional shape of the support 1010 may be different at different areas along the length of the support 1010, or the diameter or other dimension of the support 1010 may be different along the length of the support 1010. While the GC column 1005 is shown as physically contacting the support 1010, physical contact is not required. There may be a space between the GC column 1005 and the support 1010 or other intervening materials can be present between the GC column 1005 and the support 1010. While not shown, a position of either the support 1010 or one or both of the inductive elements 1015, 1020 can be altered if desired. Further, while each element 1015, 1020 is shown as a round loop for ease of illustration, other geometries such as, for example, those geometries shown in FIGS. 2A-2I or other suitable shapes could instead be used.

Figure 11:
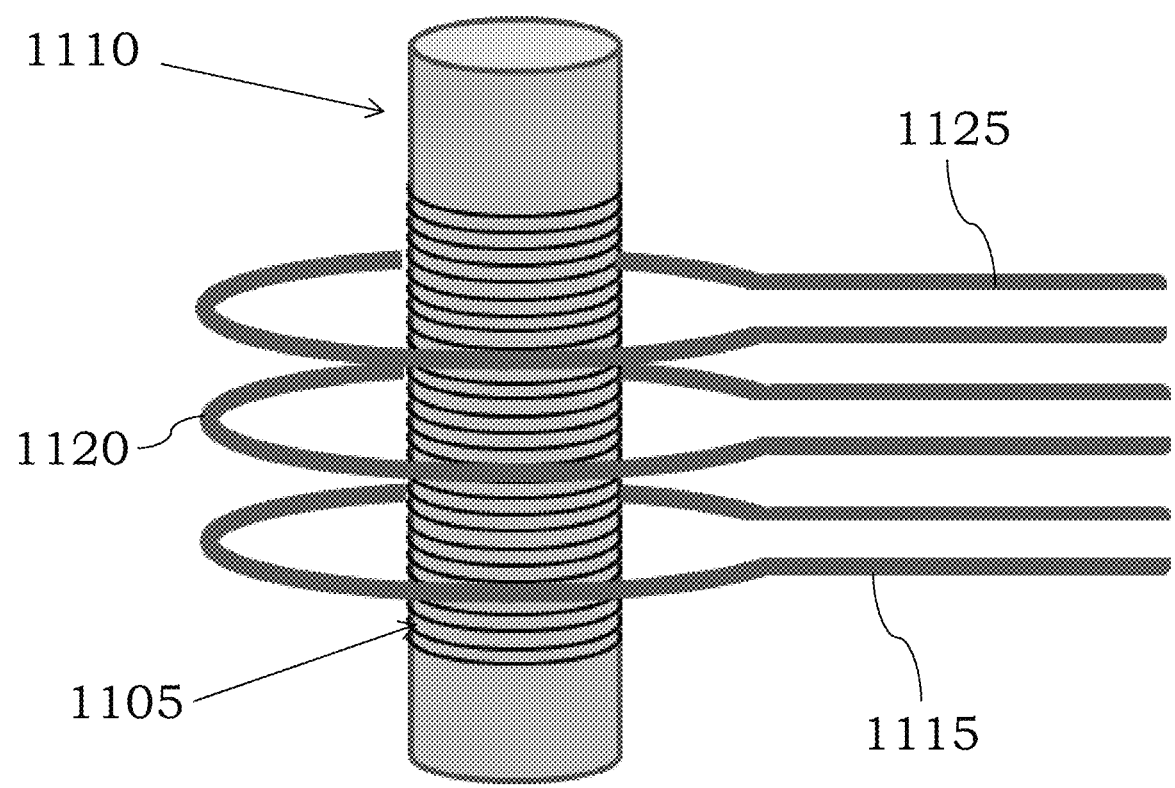
FIG. 11 is an illustration showing a heater comprising three inductive elements used with a thermally conductive support thermally coupled to a column, in accordance with certain examples.

In certain embodiments, more than two inductive elements can be used with a thermally conductive support. Referring to FIG. 11, three inductive elements 1115, 1120, 1125 and a thermally conductive support 1110 that is thermally coupled to a GC column 1105 are shown. The inductive elements 1115, 1120, and 1125 are spaced longitudinally along a length of the support 1110 such that different temperatures or heating zones can be provided using the three different inductive elements 1115, 1120, 1125. Inductive energy from each of the elements 1115, 1120, 1125 can be provided to different areas of the thermally conductive support 1110 to alter the temperature of the support 1110 at that area of region. The heat from the support 1110 can be transferred from the support 1110 to the GC column 1105 to control the temperature of the GC column 1105. For example, an area of the GC column 1105 adjacent to the inductive element 1125 could be at a higher temperature than a temperature at an area of the GC column 1105 adjacent to the inductive element 1120. Similarly, an area of the GC column 1105 adjacent to the inductive element 1015 could be at a lower temperature than a temperature at an area of the GC column 1105 adjacent to the inductive element 1120. In some instances, a cross-sectional shape of the support 1110 may be different at different areas along the length of the support 1110, or the diameter or other dimension of the support 1110 may be different along the length of the support 1110. While the GC column 1105 is shown as physically contacting the support 1110, physical contact is not required. There may be a space between the GC column 1105 and the support 1110 or other intervening materials can be present between the GC column 1105 and the support 1110. While not shown, a position of either the support 1110 or any one or more of the inductive elements 1115, 1120, 1125 can be altered if desired. Further, while each inductive element 1115, 1120, and 1125 is shown as a round loop for ease of illustration, other geometries such as, for example, those geometries shown in FIGS. 2A-2I or other suitable shapes could instead be used. As noted in more detail below, more than three inductive elements, e.g., four, five, six, seven, eight or more individual inductive elements could be used with the support 1110.

Figure 12:
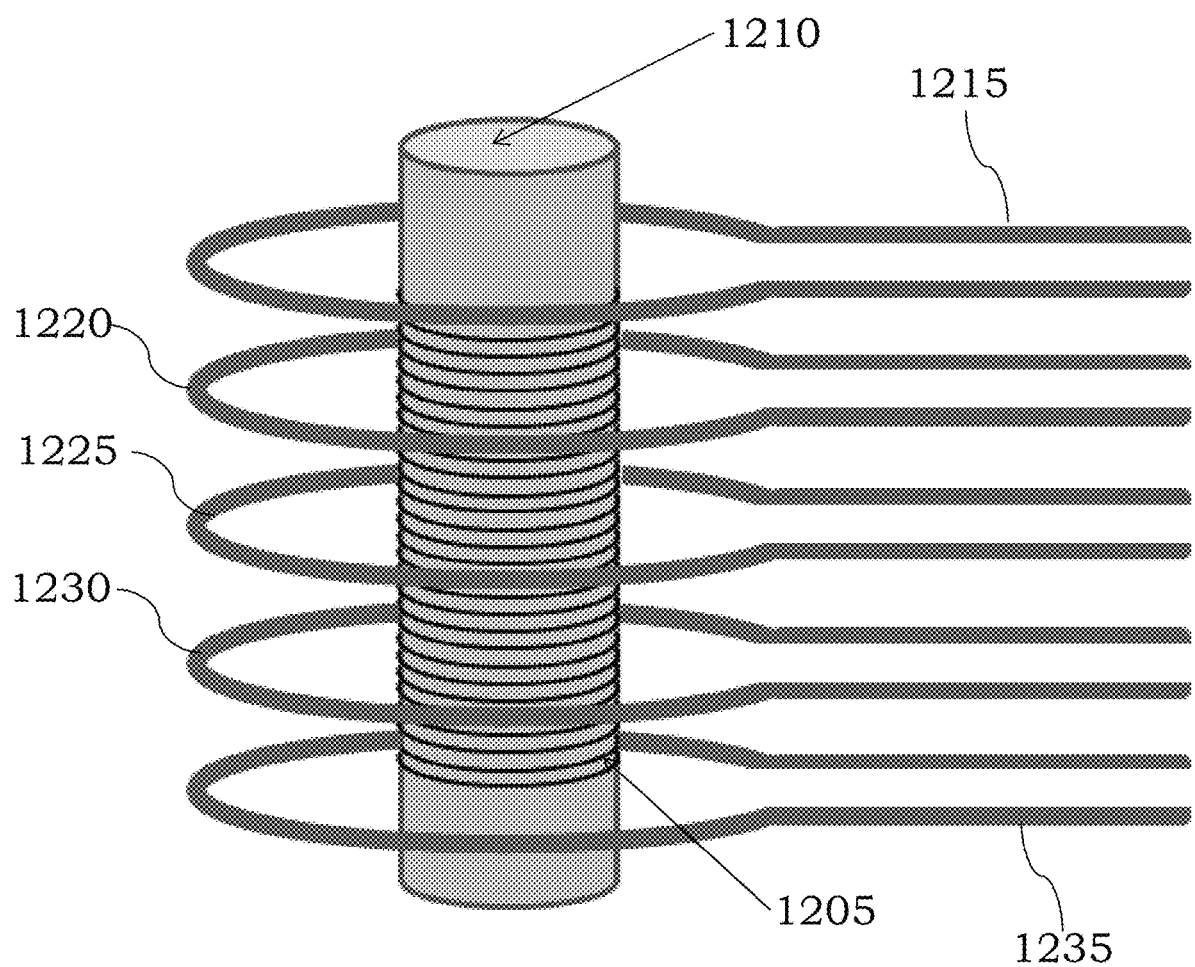
FIG. 12 is an illustration showing a heater comprising a plurality of inductive elements used with a thermally conductive support thermally coupled to a column, in accordance with some examples.

FIG. 12 is an illustration showing a heater comprising a plurality of inductive elements and a thermally conductive support. While five inductive elements are shown in FIG. 12, the exact number of inductive elements may be four, five, six, seven, eight, nine, ten or more depending, for example, on the length of the GC column and/or the desired number of heating zones. Referring to FIG. 12, five inductive elements 1215, 1220, 1225, 1230 and 1235 and a thermally conductive support 1210 that is thermally coupled to a GC column 1205 are shown. The inductive elements 1215, 1220, 1225, 1230 and 1235 are spaced longitudinally along a length of the support 1210 such that different temperatures or heating zones can be provided using the different inductive elements 1215, 1220, 1225, 1230 and 1235. Inductive energy from each of the inductive elements 1215, 1220, 1225, 1230 and 1235 can be provided to different areas of the thermally conductive support 1210 to alter the temperature of the support 1210 at a particular region adjacent to a respective element. The heat from the support 1210 can be transferred from the support 1210 to the GC column 1205 to control the temperature of the GC column 1205. For example, an area of the GC column 1205 adjacent to the inductive element 1225 could be at a higher temperature than a temperature at an area of the GC column 1205 adjacent to the inductive element 1220. Similarly, an area of the GC column 1205 adjacent to the inductive element 1215 could be at a lower temperature than a temperature at an area of the GC column 1205 adjacent to the inductive element 1220. In some instances, a cross-sectional shape of the support 1210 may be different at different areas along the length of the support 1210, or the diameter or other dimension of the support 1210 may be different along the length of the support 1210. While the GC column 1205 is shown as physically contacting the support 1210, physical contact is not required. There may be a space between the GC column 1205 and the support 1210 or other intervening materials can be present between the GC column 1205 and the support 1210. While not shown, a position of either the support 1210 or any one or more of the inductive elements 1215, 1220, 1225, 1230 and 1235 can be altered if desired. Further, while each inductive element 1215, 1220, 1225, 1230, and 1235 is shown as a round loop for ease of illustration, other geometries such as, for example, those geometries shown in FIGS. 2A-2I or other suitable shapes could instead be used.

Figure 13:
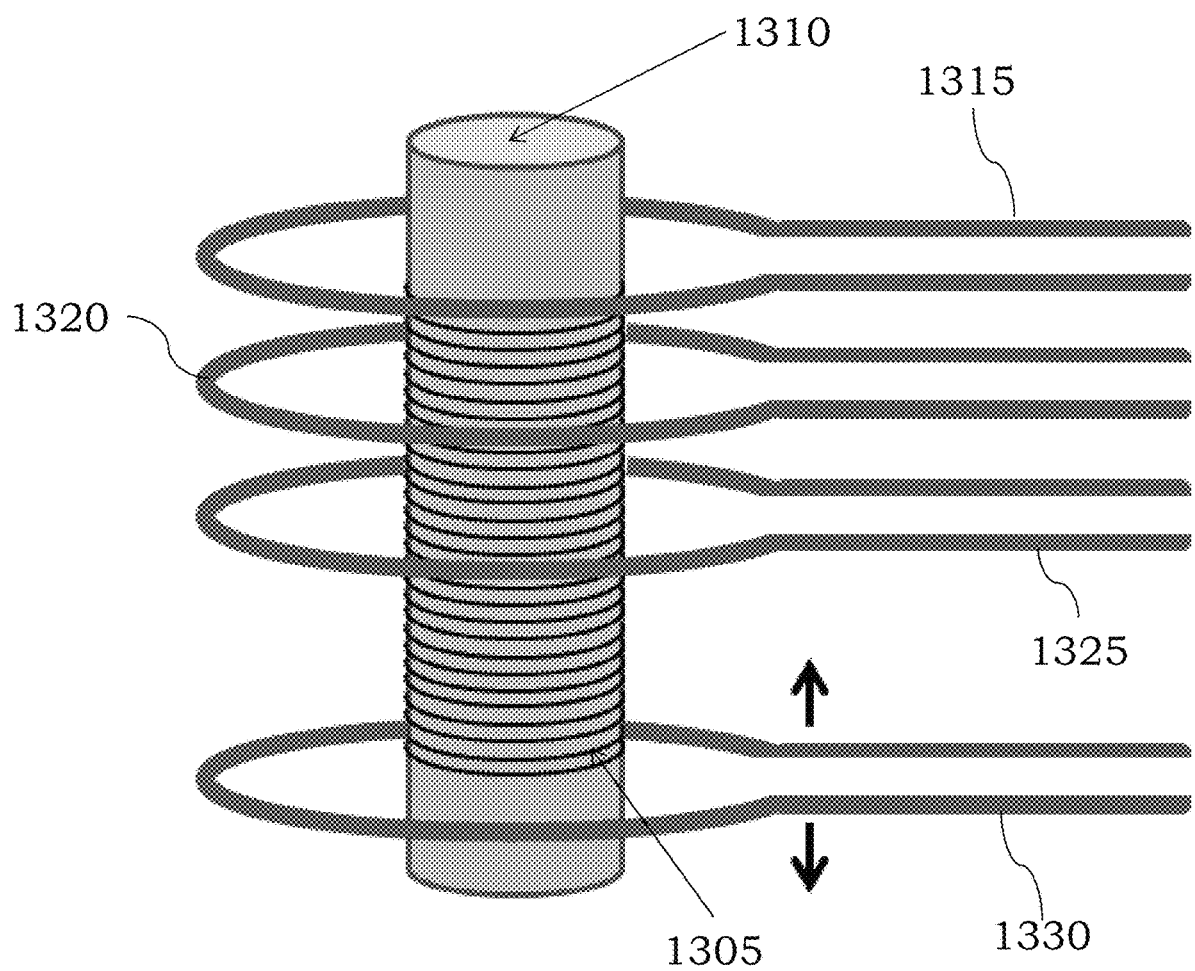
FIG. 13 is an illustration showing a heater comprising a plurality of inductive elements used with a thermally conductive support thermally coupled to a column where at least one inductive element can move, in accordance with some examples.

In certain examples, one or more of the inductive elements that is used with a thermally conductive support may be moved or moveable. For example, the inductive element may be moved longitudinally from a first position to a second position. Alternatively, the thermally conductive support and/or the GC column can be moved if desired. Referring to FIG. 13, a simplified illustration is shows four inductive elements 1315, 1320, 1325 and 1330. The inductive element 1330 can be moved up or down (as shown by the vertical arrows) relative to a first position along the longitudinal dimension of a thermally conductive support 1310, which is thermally coupled to a column 1305. If desired, a horizontal position of one or more of the inductive elements could also be altered. If desired, two of the inductive elements 1315, 1320, 1325 and 1330 may be moved or moveable. In other instances, three or four of the inductive elements 1315, 1320, 1325 and 1330 may be moved or moveable.

Figure 14:
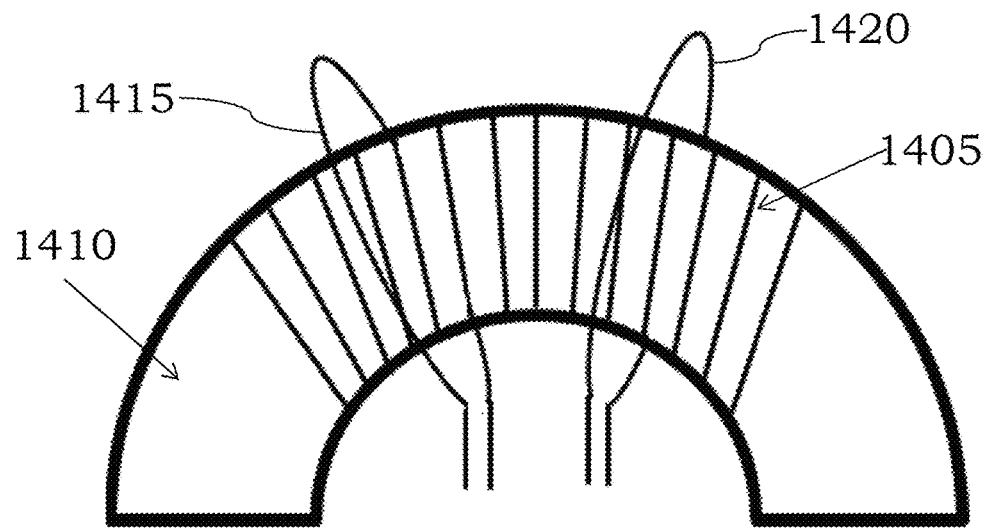
FIG. 14 is an illustration showing a curved thermally conductive support used with two inductive elements, in accordance with certain embodiments.

In some examples, the thermally conductive support may be curved or adopt non-linear forms as desired. Referring to FIG. 14, a curved thermally conductive support 1410 is shown that is thermally coupled to a GC column 1405. For example, two inductive elements 1415 and 1420 are shown as positioned along the GC column 1405 at different areas. Fewer or more than two inductive elements can be used if desired. The GC column 1405 may be positioned at a central area or center within an aperture of each inductive element 1415, 1420 or at other areas. The inductive element 1415 is tilted with respect to a longitudinal plane of the inductive element 1420. The exact angle of tilt may vary and can even be adjustable if desired. In some examples, a tilt angle of the inductive element can be selected so a central radial plane of the particular inductive element is substantially parallel to a radial plane of the individual heating zone at that area of the thermally conductive support 1410. The different inductive elements 1415 and 1420 can be used to provide a thermal gradient along the support 1410, can be used to provide a travelling wave along the support 1410 or other heating methods along the GC column 1405 and/or the support 1410 can be provided during a chromatographic separation.

Figure 15:
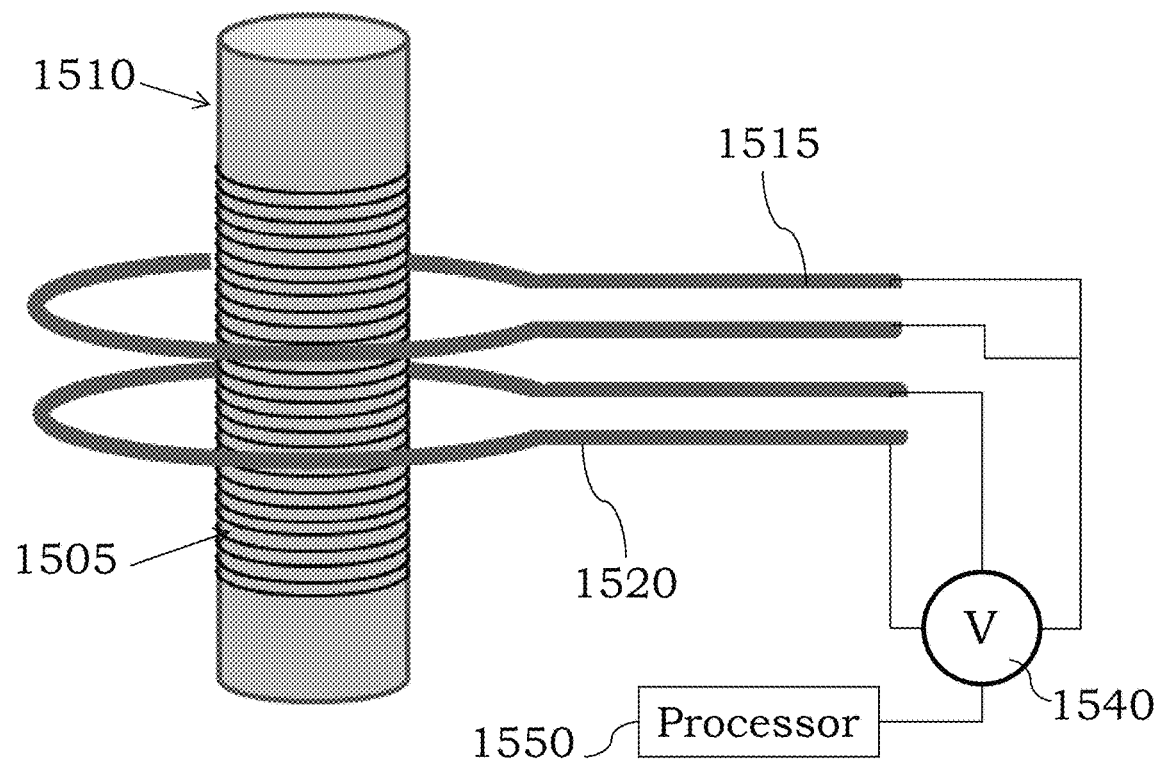
FIG. 15 is an illustration showing a processor electrically coupled to two inductive elements, in accordance with some embodiments.

In certain embodiments, the heaters described herein can be electrically coupled to a processor which can be used to provide a thermal gradient along the GC column and/or thermally conductive support. A simplified illustration of certain components that can be used are shown in FIG. 15 and includes a GC column 1505, a thermally conductive support 1510, a first inductive element 1515, a second inductive element 1520, a voltage source 1540 electrically coupled to the inductive elements 1515 and 1520, and a processor 1550 electrically coupled to the voltage source 1540. To provide a temperature or thermal gradient, the temperature at one of the heating zones adjacent to the inductive elements 1515, 1520 is higher than a temperature adjacent to the other heating zone. For example, a temperature adjacent to the inductive element 1515 can be higher than a temperature adjacent to the inductive element 1520. Alternatively, a temperature adjacent to the inductive element 1515 can be lower than a temperature adjacent to the inductive element 1520. The thermal gradient can be provided, for example, by controlling the inductive energy provided to each of the elements 1515, 1520. Without being bound to a particular theory, increased current provided to the inductive element can result in an increase in temperature of the GC column and/or thermally conductive support adjacent to that particular inductive element. The thermal gradient can be produced before a sample is introduced into the GC column 1505 or after a sample is introduced into the GC column 1505. For example, it may be desirable to ramp the temperature of upstream areas of the GC column 1505 to assist in removal of tightly adsorbed species and reduce overall GC run time. This strategy may be particularly beneficial after, for example, other analyte species have already eluted from the GC column 1505. In an alternative configuration as discussed below, a travelling thermal wave can be provided using the processor 1550 to cause a temperature wave to move down a GC column during a separation.

Figure 16A:
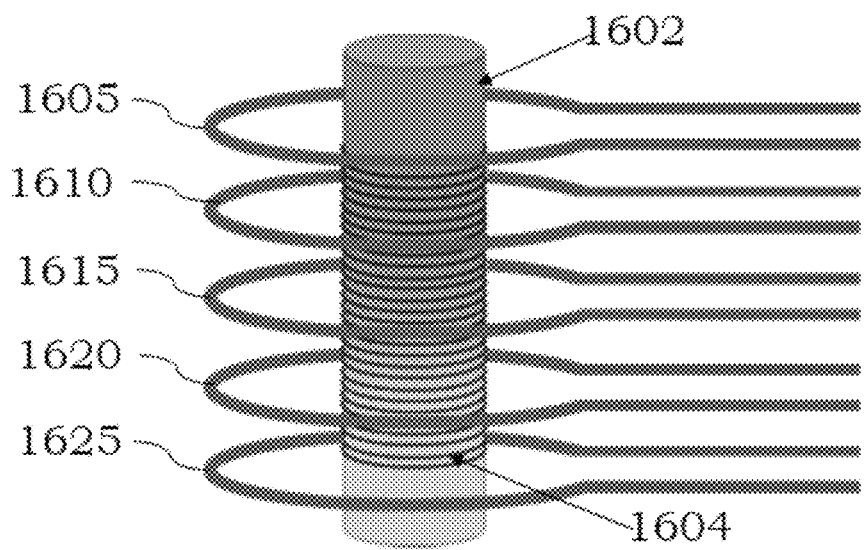
FIGS. 16A, 16B and 16C are illustrations showing alteration of a temperature along a length of a column to provide a traveling thermal wave, in accordance with some embodiments.
Figure 16B:
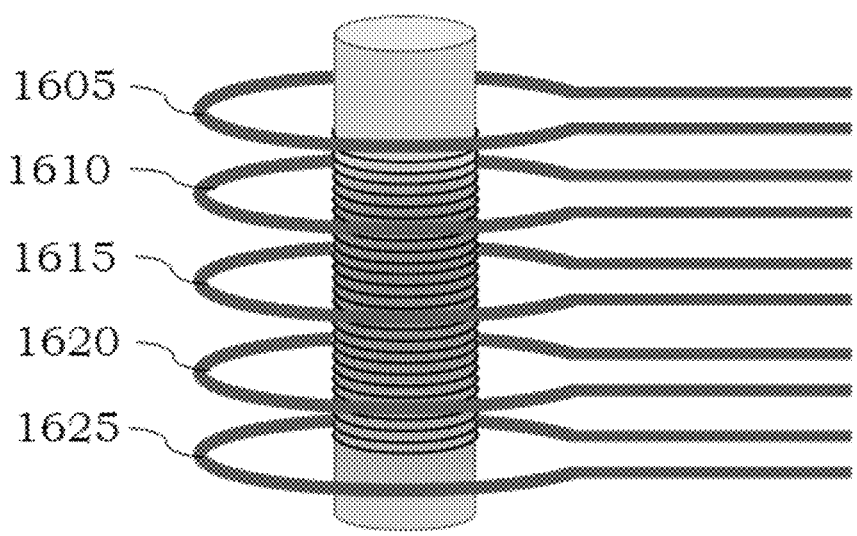
Figure 16C:
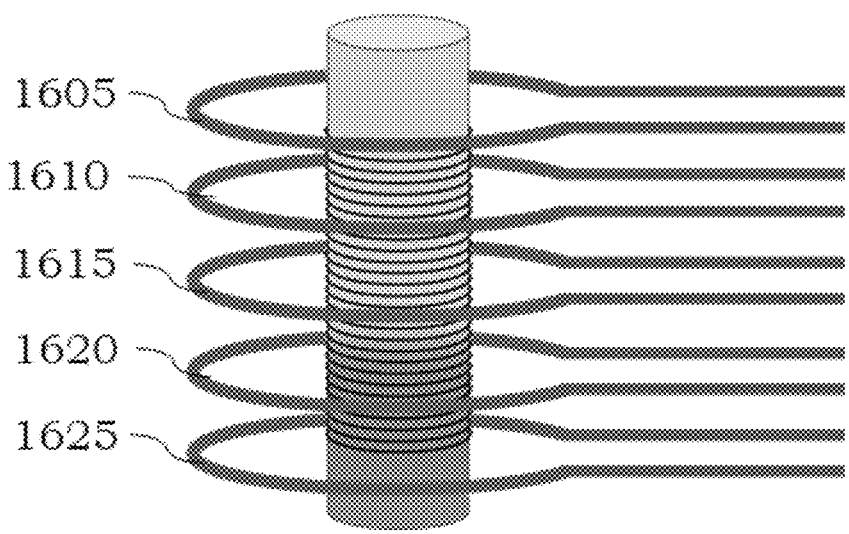

In certain instances, the inductive elements can be used to provide a traveling thermal wave that moves along a length of the GC column and any thermally conductive support that is used. An illustration is shown in FIGS. 16A, 16B and 16C where different temperatures are illustrated using the different grey shading with darker shades generally reflecting a higher temperature. Referring to FIG. 16A, at a start position of the wave a temperature adjacent to the inductive elements 1605, 1610 is higher than a temperature adjacent to the inductive elements 1615, 1620, and 1625. By controlling the voltage provided to the various inductive elements 1605, 1610, 1615, 1620 and 1625, the temperature can be altered down the thermally conductive support 1602 to alter the temperature of the GC column 1604. Referring to FIG. 16B, a temperature adjacent to the inductive elements 1610, 1615 is now higher than a temperature adjacent to the inductive elements 1605, 1620 and 1625. The thermal wave has moved from an initial position closer to an inlet end of the GC column 1604 toward central area between an inlet end and an outlet end (or exit end) of the GC column 1604. Referring to FIG. 16C, a temperature adjacent to the inductive elements 1620, 1625 is higher than a temperature adjacent to the inductive elements 1605, 1620 and 1615. The thermal wave has moved from the central position of the GC column 1604 toward an outlet of the GC column 1604. By altering the temperature at certain areas of the support 1602, the thermal wave can move down the GC column during a chromatographic separation.

Figure 17:
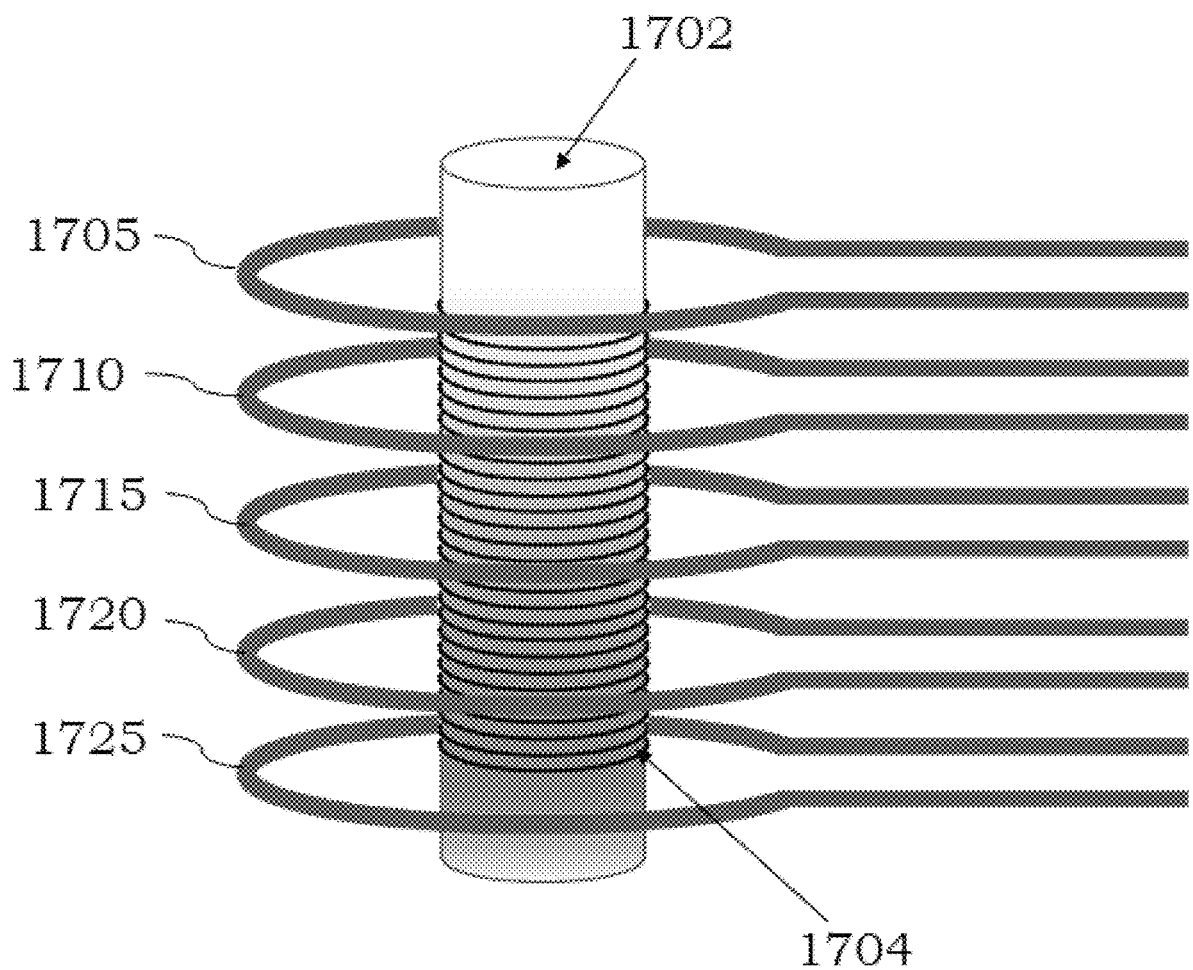
FIG. 17 is an illustration showing a temperature gradient, in accordance with some examples.

In some embodiments, the inductive elements described herein can be used to provide a non-traveling thermal gradient along the length of a GC column. Referring to FIG. 17, each of inductive elements 1705, 1710, 1715, 1720, and 1725 can be controlled to provide increasing temperature along a thermally conductive support 1702 and a GC column 1704 by providing a higher temperature at an area adjacent to the inductive element 1725 than a temperature at an inductive element 1705, as noted by the darker gray shading adjacent to inductive element 1725. The temperature gradient can be linear or non-linear along the length of the thermally conductive support 1702. Further, the temperature could increase from the inductive element 1705 toward the inductive element 1715 and then decrease from the inductive element 1715 toward the inductive element 1725, if desired. Alternatively, the temperature can increase or decrease independently between different inductive elements.

Figure 18:
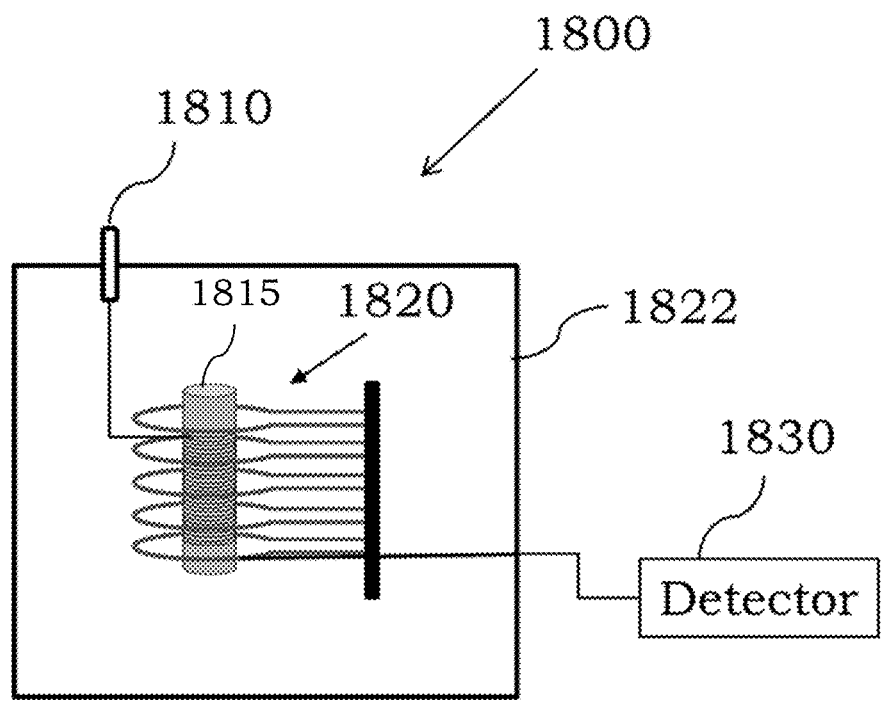
FIG. 18 is an illustration showing certain components present in a gas chromatography system, in accordance with some embodiments.

In certain embodiments, the inductive heaters described herein can be used in a gas chromatography system. An illustrative block diagram of a GC system is shown in FIG. 18. A GC system 1800 typically comprises an injector 1810 fluidically coupled to a GC column 1815 positioned in an oven 1822 configured to maintain a sample in the gas phase as it passes through the GC column 1815. A thermally conductive support, GC column and inductive heater assembly (collectively 1820) can be present within the oven. Alternatively, the GC column 1815 and inductive heaters can be used without the thermally conductive support. Further, the oven 1822 can be omitted entirely if desired, since the inductive elements can control the temperature of the GC 1815. A carrier gas (not shown) can be used to carry analyte from the injector 1810 into the GC column 1815 of the assembly 1820, where different analytes can then be separated using the carrier gas mobile phase and the stationary phase present in the column. The eluent exiting the GC column 1815 can be provided to a detector 1830 to detect the separated analytes. For example, individual analyte components may sequentially be provided to a detector, e.g., a flame ionization detector, a flame photometric detector, a thermal conductivity detector, an electron capture detector, a nitrogen-phosphorous detector, a photo-ionization detector, a thermionic ionization detector, a mass spectrometer and other detectors. In some examples, the detector or other component fluidically coupled to the GC column 1815 may be a plasma detector or may include a plasma such as, for example, an inductively coupled plasma (ICP) or a capacitively coupled plasma (CCP).

Figure 19:
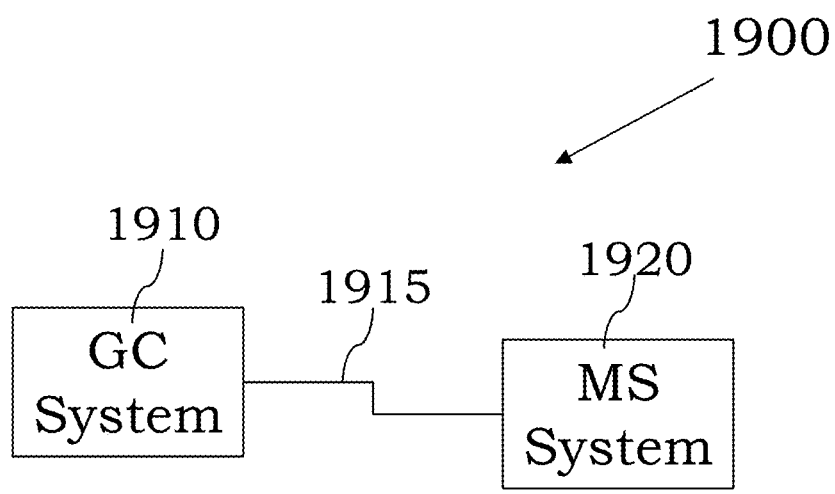
FIG. 19 is an illustration showing a block diagram of a GC-MS system, in accordance with certain examples.
Figure 20:
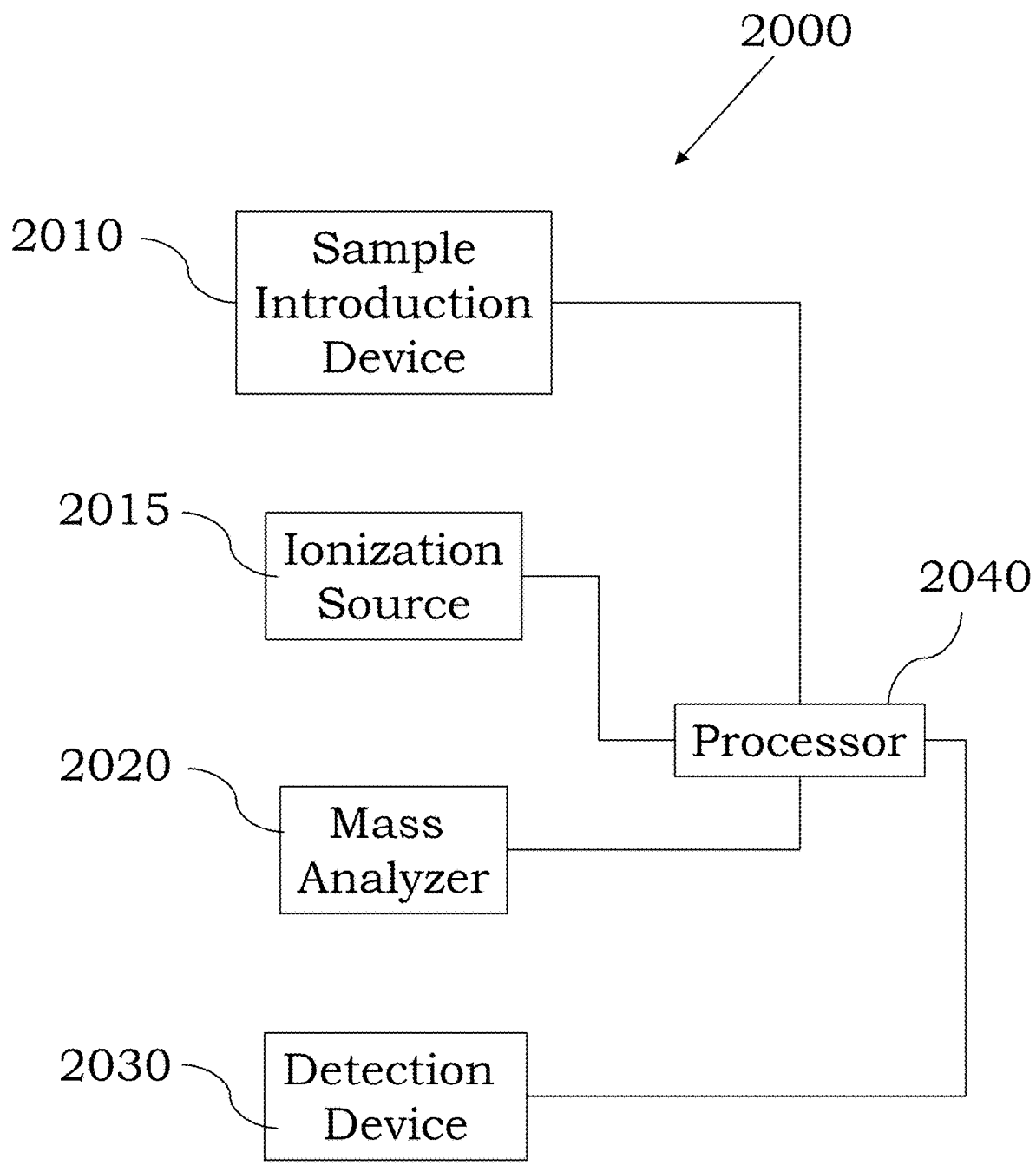
FIG. 20 is an illustration showing some components present in a mass spectrometer, in accordance with certain examples.

In some embodiments, a GC system comprising one or more inductive heaters may be fluidically coupled to an MS system as shown in FIG. 19. The GC-MS system 1900 comprises a GC system 1910 comprising one or more inductive heaters. The GC system 1910 is fluidically coupled to a MS system 1920, e.g., through a transfer line 1915, a suitable interface, e.g., traps, jet separators, etc., or other devices or components to provide gaseous species from the GC system 1910 to the downstream MS system 1920. Some components of the MS system 1920 are shown in FIG. 20. A MS system 2000 may comprise a sample introduction device 2010, e.g., the GC system 1910, an ionization source 2015, a mass analyzer 2020, a detection device 2030, a processor 2040 and an optional display (not shown). The mass analyzer 2020 and the detection device 2030 may be operated at reduced pressures using one or more vacuum pumps and/or vacuum pumping stages as noted in more detail below. The sample introduction device 2010 may be a transfer line, a GC system, an LC system, a nebulizer, aerosolizer, spray nozzle or head or other devices which can provide a gas or liquid sample to the ionization source 2015. The ionization source 2015 may comprise soft and hard ionization sources including, but not limited to, an electron ionization source, a chemical ionization source, a field ionization source, desorption sources such as, for example, those sources configured for fast atom bombardment, field desorption, laser desorption, plasma desorption, thermal desorption, electrohydrodynamic ionization/desorption, etc., thermospray or electrospray ionization sources or other types of ionization sources. The mass analyzer 2020 can take numerous forms depending generally on the sample nature, desired resolution, etc. and some examples of mass analyzers are discussed further below. The detection device 2030 can be any suitable detection device that can be used with existing mass spectrometers, e.g., electron multipliers, Faraday cups, coated photographic plates, scintillation detectors, etc. and other suitable devices that will be selected by the person of ordinary skill in the art, given the benefit of this disclosure. The processor 2040 typically includes a microprocessor and/or computer and suitable software for analysis of samples introduced into the MS device and can be electrically coupled to each of the devices 2010, 2015, 2020 and 2040. If desired, one or more databases can be accessed by the processor 2040 for determination of the chemical identity of species introduced into the MS device 2000. Other suitable additional devices known in the art can also be used with the MS device 2000 including, but not limited to, autosamplers, such as the Clarus GC autosampler commercially available from PerkinElmer Health Sciences, Inc.

In certain embodiments, the mass analyzer 2020 of MS device 2000 can take numerous forms depending on the desired resolution and the nature of the introduced sample. In certain examples, the mass analyzer is a scanning mass analyzer, a magnetic sector analyzer (e.g., for use in single and double-focusing MS devices), a quadrupole mass analyzer, an ion trap analyzer (e.g., cyclotrons, quadrupole ions traps), time-of-flight analyzers, and other suitable mass analyzers that can separate species with different mass-to-charge ratios. As noted in more detail below, the mass analyzer may comprise two or more different devices arranged in series, e.g., tandem MS/MS devices or triple quadrupole devices, to select and/or identify the ions that are received from the ionization source 2015.

In certain embodiments, the devices described herein can be used in tandem GC devices or systems, e.g., GC×GC, or otherwise used in a system comprising more than one GC column. For example, inductive elements can be used with two or more GC columns arranged in a parallel or serial manner to independently heat each GC column. The heating profile need not be the same for each GC column.

In certain examples, the methods and systems herein may comprise or use a processor, which can be part of the system or instrument or present in an associated device, e.g., computer, laptop, mobile device, etc. used with the instrument. For example, the processor can be used to control the voltages provided by the inductive elements and can control the mass analyzer and/or can be used by the detector. Such processes may be performed automatically by the processor without the need for user intervention or a user may enter parameters through user interface. For example, the processor can use signal intensities and fragment peaks along with one or more calibration curves to determine an identity and how much of each molecule is present in a sample. In certain configurations, the processor may be present in one or more computer systems and/or common hardware circuitry including, for example, a microprocessor and/or suitable software for operating the system, e.g., to control the sample introduction device, ionization sources, mass analyzer, detector, etc. In some examples, the detection device itself may comprise its own respective processor, operating system and other features to permit detection of various molecules. The processor can be integral to the systems or may be present on one or more accessory boards, printed circuit boards or computers electrically coupled to the components of the system. The processor is typically electrically coupled to one or more memory units to receive data from the other components of the system and permit adjustment of the various system parameters as needed or desired. The processor may be part of a general-purpose computer such as those based on Unix, Intel PENTIUM-type processor, Intel Core™ processors, Intel Xeon™ processsors, AMD Ryzen™ processors, AMD Athlon™ processors, AMD FX™ processors, Motorola PowerPC, Sun UltraSPARC, Hewlett-Packard PA-RISC processors, Apple-designed processors including Apple A12 processor, Apple A11 processor and others or any other type of processor. One or more of any type computer system may be used according to various embodiments of the technology. Further, the system may be connected to a single computer or may be distributed among a plurality of computers attached by a communications network. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, calibration curves, GC separation routines, and data values during operation of the inductive heaters, ionization sources and any instrument including the devices described herein. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the system. For example, computer control can be implemented to control the inductive heaters, travelling wave parameters, thermal gradient parameters and/or inductive heater voltages, frequencies, etc. The processor typically is electrically coupled to a power source which can, for example, be a direct current source, an alternating current source, a battery, a fuel cell or other power sources or combinations of power sources. The power source can be shared by the other components of the system. The system may also include one or more input devices, for example, a keyboard, mouse, trackball, microphone, touch screen, manual switch (e.g., override switch) and one or more output devices, for example, a printing device, display screen, speaker. In addition, the system may contain one or more communication interfaces that connect the computer system to a communication network (in addition or as an alternative to the interconnection device). The system may also include suitable circuitry to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface, a USB interface, a Fibre Channel interface, a Firewire interface, a M.2 connector interface, a PCIE interface, a mSATA interface or the like or through one or more wireless interfaces, e.g., Bluetooth, Wi-Fi, Near Field Communication or other wireless protocols and/or interfaces.

In certain embodiments, the storage system used in the systems described herein typically includes a computer readable and writeable nonvolatile recording medium in which codes of software can be stored that can be used by a program to be executed by the processor or information stored on or in the medium to be processed by the program. The medium may, for example, be a hard disk, solid state drive or flash memory. The program or instructions to be executed by the processor may be located locally or remotely and can be retrieved by the processor by way of an interconnection mechanism, a communication network or other means as desired. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC), microprocessor units MPU) or a field programmable gate array (FPGA) or combinations thereof.

Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may be also implemented using specially programmed, special purpose hardware. In the systems, the processor is typically a commercially available processor such as the well-known microprocessors available from Intel, AMD, Apple and others. Many other processors are also commercially available. Such a processor usually executes an operating system which may be, for example, the Windows 7, Windows 8 or Windows 10 operating systems available from the Microsoft Corporation, MAC OS X, e.g., Snow Leopard, Lion, Mountain Lion, Mojave, High Sierra, El Capitan or other versions available from Apple, the Solaris operating system available from Sun Microsystems, or UNIX or Linux operating systems available from various sources. Many other operating systems may be used, and in certain embodiments a simple set of commands or instructions may function as the operating system. Further, the processor can be designed as a quantum processor designed to perform one or more functions using one or more qubits.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer or other portable devices which can communicate through a wired or wireless interface and permit operation of the systems remotely as desired.

In certain examples, the processor may also comprise or have access to a database of information about molecules, their fragmentation patterns, and the like, which can include molecular weights, mass-to-charge ratios and other common information. The instructions stored in the memory can execute a software module or control routine for the system, which in effect can provide a controllable model of the system. The processor can use information accessed from the database together with one or software modules executed in the processor to determine control parameters or values for different components of the systems, e.g., different GC separation parameters, different thermal gradient routines, different travelling wave routines, etc. Using input interfaces to receive control instructions and output interfaces linked to different system components in the system, the processor can perform active control over the system. For example, the processor can control the inductive heaters, the detection device, sample introduction devices, ionization sources, GC system, mass analyzers, and other components of the system.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A heater comprising a plurality of individual inductive heaters, each individual inductive heater comprising an inductive element and an aperture configured to receive a gas chromatography column, each inductive element comprising a plane being arranged substantially parallel to a plane of each of the other inductive elements, wherein each of the plurality of individual inductive heaters provides an individually controlled heating zone along a longitudinal axis of the gas chromatography column positioned in the apertures of the inductive heaters, each individually controlled heating zone corresponding to a position of a respective inductive element, and wherein a space is present between each inductive element and the gas chromatography column when the gas chromatography column is positioned within the apertures of each inductive element of the plurality of individual inductive heaters.

2. The heater of claim 1, wherein at least one inductive element comprises a planar loop positioned in a radial plane perpendicular to the longitudinal axis of the gas chromatography column positioned in the apertures.

3. The heater of claim 1, wherein each inductive element comprises a planar loop positioned in a radial plane perpendicular to the longitudinal axis of the gas chromatography column positioned in the apertures.

4. The heater of claim 1, wherein at least one inductive element comprises a helix with a radial plane positioned perpendicular to the longitudinal axis of the gas chromatography column positioned in the apertures.

5. The heater of claim 1, wherein at least one inductive element comprises a conical shape with a radial plane positioned perpendicular to the longitudinal axis of the gas chromatography column positioned in the apertures.

6. The heater of claim 1, wherein the plurality of individual inductive heaters comprises at least three individual inductive heaters.

7. The heater of claim 1, wherein the inductive elements of the individual inductive heaters are evenly spaced along the longitudinal axis of the gas chromatography column.

8. The heater of claim 1, wherein each of the inductive elements comprises a similar cross-sectional shape.

9. The heater of claim 1, wherein a cross-sectional shape of a first inductive element is different than a cross-sectional shape of a second inductive element.

10. A gas chromatography system comprising:
   a column space configured to receive a gas chromatography column;
   the heater of claim 1; and
   a detector configured to fluidically couple to the gas chromatography column in the column space.

11. The gas chromatography system of claim 10, wherein at least one inductive element comprises a planar loop in a radial plane perpendicular to the longitudinal axis of the gas chromatography column positioned in the apertures of the plurality of individual inductive heaters.

12. The gas chromatography system of claim 10, wherein each inductive element comprises a planar loop in a radial plane perpendicular to the longitudinal axis of the gas chromatography column positioned in the apertures of the plurality of individual inductive heaters.

13. The gas chromatography system of claim 10, wherein at least one inductive element comprises a helix in a radial plane perpendicular to the longitudinal axis of the gas chromatography column positioned in the apertures of the plurality of individual inductive heaters.

14. The gas chromatography system of claim 10, wherein at least one inductive element comprises a conical shape in a radial plane perpendicular to the longitudinal axis of the gas chromatography column positioned in the apertures of the plurality of individual inductive heaters.

15. The gas chromatography system of claim 10, further comprising a thermally conductive support positioned in the apertures of the plurality of individual inductive heaters, wherein the gas chromatography column is wound around the thermally conductive support to position the longitudinal axis of the gas chromatography column perpendicular to a radial plane of each inductive element of the inductive heaters, and wherein the thermally conductive support is magnetically coupled to each of the inductive elements of the plurality of individual inductive heaters.

16. A heater comprising a plurality of inductive heaters, each inductive heater comprising an inductive element and an aperture configured to receive a gas chromatography column, each inductive element comprising a plane being arranged substantially parallel to a plane of each of the other inductive elements, wherein each of the plurality of inductive heaters provides an individually controlled heating zone along a longitudinal axis of the gas chromatography column positioned in the apertures of the inductive heaters, each individually controlled heating zone corresponding to a position of a respective inductive element, the heater further comprising a thermally conductive support positioned in the apertures, wherein the gas chromatography column is wound around the thermally conductive support to position the longitudinal axis of the gas chromatography column perpendicular to a radial plane of each inductive element of the inductive heaters, and wherein the thermally conductive support is magnetically coupled to each of the inductive elements.

17. A method of providing a thermal gradient to a gas chromatography column, the method comprising individually controlling a temperature at each of a plurality of heating zones along a longitudinal axis of the gas chromatography column using a plurality of individual inductive heaters, wherein the temperature at each heating zone is controlled using a respective one of the plurality of individual inductive heater, wherein each individual inductive heater comprises an inductive element and an aperture configured to receive the gas chromatography column, wherein a space is present between each inductive element and the gas chromatography column when the gas chromatography column is positioned within the apertures of each inductive element of the plurality of individual inductive heaters, and wherein the temperature at a heating zone at an inlet end of the gas chromatography column is different than a temperature at a heating zone at an exit end of the gas chromatography column to provide the thermal gradient to the gas chromatography column positioned in the apertures of the respective individual inductive heaters.

18. The method of claim 17, wherein the thermal gradient is provided by heating each heating zone along the longitudinal axis of the gas chromatography column, wherein a temperature along the heating zones decreases from the inlet end of the gas chromatography column to the exit end of gas chromatography column.

19. The method of claim 17, wherein the respective individual inductive heaters heat the gas chromatography column and provide the thermal gradient to the gas chromatography column without using an oven.

20. The method of claim 17, further comprising moving at least one of the individual inductive heaters along the longitudinal axis of the positioned gas chromatography column to provide a thermal gradient.

21. A method of providing a thermal gradient to a gas chromatography column, the method comprising individually controlling a temperature at each of a plurality of heating zones along a longitudinal axis of the gas chromatography column, wherein the temperature at each heating zone is controlled using a respective inductive heater comprising an inductive element, and wherein the temperature at a heating zone at an inlet end of the gas chromatography column is different than a temperature at a heating zone at an exit end of the gas chromatography column to provide the thermal gradient to the gas chromatography column, wherein the gas chromatography column is wound around a thermally conductive support that is configured to position the longitudinal axis of the gas chromatography column perpendicular to a plane of each inductive element of the inductive heaters, and wherein the thermally conductive support is magnetically coupled to each of the inductive elements.

* * * * *